US011259295B2

United States Patent
Li et al.

(10) Patent No.: US 11,259,295 B2
(45) Date of Patent: Feb. 22, 2022

(54) RESOURCE SELECTION METHOD, DATA TRANSMISSION METHOD AND DEVICE

(71) Applicant: DATANG MOBILE COMMUNICATIONS EQUIPMENT CO., LTD., Beijing (CN)

(72) Inventors: Chenxin Li, Beijing (CN); Fang-Chen Cheng, Beijing (CN); Rui Zhao, Beijing (CN); Yingmin Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 17/290,473

(22) PCT Filed: Oct. 31, 2019

(86) PCT No.: PCT/CN2019/114720
§ 371 (c)(1),
(2) Date: Apr. 30, 2021

(87) PCT Pub. No.: WO2020/088593
PCT Pub. Date: May 7, 2020

(65) Prior Publication Data
US 2021/0314929 A1 Oct. 7, 2021

(30) Foreign Application Priority Data
Nov. 1, 2018 (CN) .......................... 201811297361.1

(51) Int. Cl.
H04W 72/04 (2009.01)
H04W 28/02 (2009.01)
H04W 72/10 (2009.01)

(52) U.S. Cl.
CPC ...... H04W 72/044 (2013.01); H04W 28/0268 (2013.01); H04W 72/0493 (2013.01); H04W 72/10 (2013.01)

(58) Field of Classification Search
CPC ........... H04W 72/044; H04W 28/0268; H04W 72/0493; H04W 72/10
See application file for complete search history.

(56) References Cited

U.S. PATENT DOCUMENTS 10,728,908 B2 * 7/2020 Kwak ................ H04W 72/0406
11,026,217 B2 * 6/2021 Chae ...................... H04L 5/0044
(Continued)

FOREIGN PATENT DOCUMENTS

CN 106797644 A 5/2017
CN 108521884 A 9/2018
(Continued)

OTHER PUBLICATIONS

International Search Report for International Application No. PCT/CN2019/114720 dated Feb. 1, 2020.
(Continued)

Primary Examiner — Kashif Siddiqui
(74) Attorney, Agent, or Firm — Meunier Carlin & Curfman LLC

(57) ABSTRACT

The present application discloses a resource selection method, a data transmission method and a device, relating to the field of communication technology. In the embodiment of the present application, in a case where it is determined that the resource multiplexing mode of the first link and the second link is frequency division multiplexing, by judging whether the selected link is allowed to select a resource that overlaps with the selected resource on another link in the time domain, it may further determine whether to select a resource that does not overlap with the selected resource on
(Continued)

another link in the time domain to transmit a service packet to be sent, such that it can also be adjusted according to actual needs based on the pre-configuration, thereby greatly increasing the flexibility of resource selection and the efficiency of spectrum use.

18 Claims, 4 Drawing Sheets

(56) References Cited

U.S. PATENT DOCUMENTS

| | | | | |
|---|---|---|---|---|
| 2016/0112858 A1* | 4/2016 | Nguyen | ............... | H04W 74/002 370/329 |
| 2017/0332352 A1 | 11/2017 | Sheng | | |
| 2018/0092065 A1 | 3/2018 | Sheng | | |
| 2019/0239216 A1* | 8/2019 | Kundu | ................. | H04L 5/0053 |
| 2019/0246385 A1* | 8/2019 | Lin | ................. | H04W 72/044 |
| 2020/0053741 A1* | 2/2020 | Wang | .................. | H04W 4/70 |
| 2021/0127413 A1* | 4/2021 | Lu | .................. | H04W 72/044 |

FOREIGN PATENT DOCUMENTS

| | | |
|---|---|---|
| WO | 2017171528 A1 | 10/2017 |
| WO | 2017173133 A1 | 10/2017 |

OTHER PUBLICATIONS

Samsung. 3GPP TSG RAN WGI Meeting #94bis R1-1810870 Discussion on Resource Allocation Mechanisms for NR V2X, Oct. 12, 2018.

Catt. "3GPP TSG RAN1 Meeting #94bis R1-1810547," Discussion on Coexistence of LTE Sidelink and NR Sidelink in NR V2X, Oct. 12, 2018.

Written Opinion for International Application No. PCT/CN2019/114720 dated Jan. 31, 2020.

* cited by examiner

RESOURCE SELECTION METHOD, DATA TRANSMISSION METHOD AND DEVICE

CROSS-REFERENCE OF RELATED APPLICATIONS

The application is a national phase entry under 35 U.S.C. § 371 of International Application No. PCT/CN2019/114720, filed on Oct. 31, 2019, which claims the priority from Chinese Patent Application No. 201811297361.1, filed with the Chinese Patent Office on Nov. 1, 2018 and entitled "Resource Selection Method, Data Transmission Method and Device", which is hereby incorporated by reference in its entirety.

FIELD

The application relates to the field of communication technologies, and particularly to a resource selection method and a data transmission method and device.

BACKGROUND

The 3rd Generation Partnership Project (3GPP) Release 14 and Release 15 define the Vehicle to Everything (V2X) protocol of wireless communication of Internet of Vehicles based on Long Time Evolution (LTE), which includes two communication modes, namely the sidelink communication between vehicles and the uplink/downlink communication between vehicles and base stations. Here, the sidelink communication between vehicles includes two transmission modes, mode 3 and mode 4, where in mode 3 the base station schedules and allocates resources for vehicles, and in mode 4 the vehicles select resources autonomously.

The LTE-V2X protocol of the 3GPP Release 14 is the technical specification of the first stage of V2X, and can meet the basic requirements and support the basic traffic safety services of 3GPP TR 22.885. The LTE-V2X protocol of the 3GPP Release 15 is the technical specification of the second stage of V2X, and introduces the carrier aggregation, high-order modulation, delay reduction and other mechanisms. The related enhanced functions can support a part of application cases of the enhanced V2X (eV2X) in 3GPP TR22.886. The use cases that cannot be supported by the 3GPP Release 14 and Release 15 of LTE-V2X in 3GPP TR22.886 will be studied and supported in the third phase of 3GPP V2X.

The 3GPP RAN #80 meeting passed the project approval of the Study Item (SI) of New Radio (NR) V2X in the third phase of 3GPP V2X, where the research direction includes the coexistence research of the sidelink of Vehicle to Everything in Internet of Vehicles of Long Term Evolution (LTE V2X sidelink) and the sidelink of Vehicle to Everything in Internet of Vehicles of New Radio (NR V2X sidelink), and the basic principle is: the NR V2X sidelink and the LTE V2X sidelink work on different channels, the NR V2X sidelink bears the advanced V2X services, and the LTE V2X sidelink bears the basic safety services.

For a terminal configured with the LTE V2X sidelink and NR V2X sidelink, generally the resources are allocated respectively for the services transmitted on the LTE V2X sidelink and NR V2X sidelink in the pre-configured resource multiplexing mode, such as time division multiplexing or frequency division multiplexing mode. However, such allocation method lacks the flexibility, which may result in the waste of resources and cannot guarantee the normal transmission of services.

Then, for the terminal configured with the LTE V2X sidelink and NR V2X sidelink, how to improve the flexibility of resource selection and the spectrum usage efficiency is a technical problem to be solved urgently by those skilled in the art.

SUMMARY

The embodiments of the application provide a resource selection method and a data transmission method and device, so as to improve the flexibility of resource selection and spectrum usage efficiency for the terminal configured with the LTE V2X sidelink and NR V2X sidelink.

In a first aspect, an embodiment of the application provides a resource selection method, including:

determining, by a terminal configured with a first link and a second link, a transmission link for a service packet to be transmitted; wherein the first link and the second link are used to transmit different types of service packets;

judging, by the terminal, whether resources on the transmission link for the service packet to be transmitted that overlap in time domain with resources that have been selected on other link are allowed to be selected, when determining that a resource multiplexing mode of the first link and the second link is frequency division multiplexing;

if so, selecting, by the terminal, transmission resources for the service packet to be transmitted among time-frequency resources available on the transmission link for the service packet to be transmitted, wherein selectable resources comprise: resources that overlap in the time domain with resources that have been selected on the other link, and/or resources that do not overlap in the time domain with resources that have been selected on the other link;

if not, selecting, by the terminal, transmission resources that do not overlap in the time domain with resources that have been selected on the other link for the service packet to be transmitted among the time-frequency resources available on the transmission link for the service packet to be transmitted.

Optionally, after selecting resources for the service packet to be transmitted, the method further includes:

performing, by the terminal, power allocation or transmitting order adjustment on service packets to be transmitted on resources that overlap in the time domain on the first link and the second link respectively, according to priorities of the service packets to be transmitted on the resources that overlap in the time domain on the first link and the second link.

Optionally, performing, by the terminal, power allocation or transmitting order adjustment on service packets to be transmitted on resources that overlap in the time domain on the first link and the second link respectively according to priorities of the service packets to be transmitted on the resources that overlap in the time domain on the first link and the second link, specifically includes:

if the priorities of the service packets to be transmitted on the resources that overlap in the time domain on the first link and the second link are different, allocating power that meets a packet delay budget to a service packet with high priority, and performing power reduction, dropping transmission or resource re-selection for a service packet with low priority;

or, if determining that the priorities of the service packets to be transmitted on the resources that overlap in the time domain on the first link and the second link are same, performing the power allocation or transmitting order adjustment on the service packets to be transmitted on resources that overlap in the time domain on the first link and the second link according to a quantity of power amplifiers of the terminal.

Optionally, performing the power allocation or transmitting order adjustment on the service packets to be transmitted on resources that overlap in the time domain on the first link and the second link according to the quantity of power amplifiers of the terminal, specifically includes:

in a case that the terminal comprises a plurality of power amplifiers, transmitting service packets simultaneously through the resources that overlap in the time domain on the first link and the second link, and equally dividing transmission power for the service packets transmitted simultaneously, or allocating the transmission power for the service packets transmitted simultaneously according to a same power spectrum density of a physical sidelink shared channel;

or, in a case that the terminal comprises one power amplifier, judging whether time slot lengths of the resources that overlap in the time domain on the first link and the second link are same;

if not, selecting resources with a shorter time slot length among the resources that overlap in the time domain on the first link and the second link to transmit service packets preferentially;

if so, transmitting service packets simultaneously through the resources that overlap in the time domain on the first link and the second link, and equally dividing the power for the service packets transmitted simultaneously, or allocating the power for the service packets transmitted simultaneously according to the same power spectrum density of the physical sidelink shared channel, or randomly selecting a service packet on one of the links for transmitting.

Optionally, a priority of a service packet transmitted by the first link is determined according to a level of ProSe Per-Packet Priority, PPPP; a priority of a service packet transmitted by the second link is determined according to a level of at least one indicator of priority, packet delay budget, reliability, communication range and packet transmission rate in Quality of Service, QoS; and there is a preset correspondence between the level of the at least one indicator in the QoS of the service packet transmitted on the second link and a priority level of the service packet transmitted on the first link;

or, priorities of service packets transmitted by the first link are higher than priorities of service packets transmitted by the second link;

or, priorities of service packets transmitted by the first link are lower than priorities of service packets transmitted by the second link;

or, priorities of some service packets transmitted by the second link are higher than a priority of any service packet transmitted by the first link, and priorities of remaining service packets transmitted by the second link are lower than the priority of any service packet transmitted by the first link.

Optionally, judging whether resources on the transmission link for the service packet to be transmitted that overlap in time domain with resources that have been selected on other link are allowed to be selected, specifically includes:

excluding, on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold;

if so, the resources on the transmission link for the service packet to be transmitted that overlap in the time domain with resources that have been selected on the other link are allowed to be selected;

if not, the resources on the transmission link for the service packet to be transmitted that overlap in the time domain with resources that have been selected on the other link are not allowed to be selected.

Optionally, judging whether resources on the transmission link for the service packet to be transmitted that overlap in time domain with resources that have been selected on other link are allowed to be selected, specifically includes:

in a case that the terminal comprises one power amplifier, the resources on the transmission link for the service packet to be transmitted that overlap in time domain with resources that have been selected on other link are not allowed to be selected;

or, in a case that the terminal comprises a plurality of power amplifiers, the resources on the transmission link for the service packet to be transmitted that overlap in time domain with resources that have been selected on other link are allowed to be selected.

Optionally, whether resources on the transmission link for the service packet to be transmitted that overlap in time domain with resources that have been selected on other link are allowed to be selected, specifically includes:

excluding on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold, and judging whether the terminal comprises a plurality of power amplifiers;

if two judgment conditions are both met, the resources on the transmission link for the service packet to be transmitted that overlap in time domain with resources that have been selected on other link are allowed to be selected;

otherwise, the resources on the transmission link for the service packet to be transmitted that overlap in time domain with resources that have been selected on other link are not allowed to be selected.

Optionally, the preset threshold is the minimum number of resources that meet the packet delay budget and a requirement for the number of initial transmission and retransmissions;

and/or, the preset threshold is determined according to a preset correspondence between a level of at least one indicator in the QoS of service packets transmitted on the second link and a priority of each service packet on the first link.

Optionally, before selecting resources for the service packet to be transmitted, the method further includes:

excluding resources determined to be occupied on the transmission link to obtain a second candidate resource set; wherein the second candidate resource set comprises the resources that overlap in the time domain with resources that have been selected on the other link, and the second candidate resource set corresponds to the selectable resources;

selecting resources for the service packet to be transmitted among time-frequency resources available on the transmission link for the service packet to be transmitted, specifically includes:

selecting resources for the service packet to be transmitted from the second candidate resource set;

or, screening the second candidate resource set according to a first preset screening rule, and then selecting resources for the service packet to be transmitted in the screened second candidate resource set.

Optionally, after obtaining the second candidate resource set, the method further includes:

for the second candidate resource set, in a case that the terminal comprises one power amplifier, traversing resources that overlap in the time domain with resources that have been selected on the other link in the second candidate resource set;

in response to determining that there are resources that overlap in the time domain with and have a different time slot length from the resources that have been selected on the other link, excluding the resources that overlap in the time domain with and have the different time slot length from the second candidate resource set, to obtain an updated second candidate resource set.

Optionally, before selecting the resources that do not overlap in the time domain with resources that have been selected on the other link for the service packet to be transmitted, the method further includes:

excluding on the transmission link for the service packet to be transmitted, resources determined to be occupied and the resources that overlap in the time domain with resources that have been selected on the other link, to obtain a first candidate resource set;

selecting resources that do not overlap in the time domain with resources that have been selected on the other link for the service packet to be transmitted among the time-frequency resources available on the transmission link for the service packet to be transmitted, specifically includes:

selecting resources for the service packet to be transmitted in the first candidate resource set;

or, screening the first candidate resource set according to a second preset screening rule, and selecting resources for the service packet to be transmitted in the screened first candidate resource set.

Optionally, when determining that the resource multiplexing mode of the first link and the second link is time division multiplexing or a combination of time division multiplexing and frequency division multiplexing, the method further includes:

selecting resources for the service packet to be transmitted among the time-frequency resources available on the transmission link under a sensing-based semi-persistent scheduling resource selection mode;

or, after monitoring a channel where the time-frequency resources available on the transmission link are located, excluding resources determined to be occupied on the transmission link to obtain a third candidate resource set, and judging whether each resource in the third candidate resource set meets a packet delay budget; in response to determining that each resource in the third candidate resource set meets a packet delay budget, performing resource selection and/or performing first back-off processing and then resource selection; otherwise, performing back-off processing and monitoring the channel again where the time-frequency resources available on the transmission link are located.

Optionally, a mode of monitoring the channel where the time-frequency resources available on the transmission link are located specifically includes:

decoding a control signaling transmitted in a time division multiplexing mode to obtain indication information;

or, detecting a preamble sequence to obtain indication information;

or, detecting channel energy.

In a second aspect, an embodiment of the application provides a data transmission method, including:

determining time-frequency resources for transmitting a service packet; wherein the time-frequency resources are determined by using the above resource selection method of the first aspect as provided in the embodiments of the application;

transmitting the service packet, a preset control signaling and/or a preset preamble sequence on the determined time-frequency resources.

In a third aspect, an embodiment of the application provides a resource selection device, which is applied to a terminal configured with a first link and a second link and includes:

a memory configured to store program instructions;

a processor configured to invoke the program instructions stored in the memory, and in accordance with the obtained program, perform the process of:

determining a transmission link for a service packet to be transmitted; wherein the first link and the second link are used to transmit different types of service packets;

whether resources on the transmission link for the service packet to be transmitted that overlap in time domain with resources that have been selected on other link are allowed to be selected, when determining that a resource multiplexing mode of the first link and the second link is frequency division multiplexing;

if so, selecting transmission resources for the service packet to be transmitted among time-frequency resources available on the transmission link for the service packet to be transmitted, wherein selectable resources comprise: resources that overlap in the time domain with resources that have been selected on the other link, and/or resources that do not overlap in the time domain with resources that have been selected on the other link;

if not, selecting transmission resources that do not overlap in the time domain with resources that have been selected on the other link for the service packet to be transmitted among the time-frequency resources available on the transmission link for the service packet to be transmitted.

Optionally, the processor is further configured for: after selecting resources for the service packet to be transmitted, performing power allocation or transmitting order adjustment on service packets to be transmitted on resources that overlap in the time domain on the first link and the second link respectively, according to priorities of the service packets to be transmitted on the resources that overlap in the time domain on the first link and the second link.

Optionally, the processor is specifically configured for:

if the priorities of the service packets to be transmitted on the resources that overlap in the time domain on the first link and the second link are different, allocating power that meets a packet delay budget to a service packet with high priority, and performing power reduction, dropping transmission or resource re-selection for a service packet with low priority;

or, if determining that the priorities of the service packets to be transmitted on the resources that overlap in the time domain on the first link and the second link are same, performing the power allocation or transmitting order adjustment on the service packets to be transmitted on resources that overlap in the time domain on the first link and the second link according to a quantity of power amplifiers of the terminal.

Optionally, the processor is specifically configured for:

in a case that the terminal comprises a plurality of power amplifiers, transmitting service packets simultaneously through the resources that overlap in the time domain on the first link and the second link, and equally dividing transmission power for the service packets transmitted simultaneously, or allocating the transmission power for the service packets transmitted simultaneously according to a same power spectrum density of a physical sidelink shared channel;

or, in a case that the terminal comprises one power amplifier, judging whether time slot lengths of the resources that overlap in the time domain on the first link and the second link are same;

in response to determining that the time slot lengths of the resources that overlap in the time domain on the first link and the second link are not same, selecting resources with a shorter length in time domain among the resources that overlap in the time domain on the first link and the second link to transmit service packets preferentially;

in response to determining that the time slot lengths of the resources that overlap in the time domain on the first link and the second link are same, transmitting service packets simultaneously through the resources that overlap in the time domain on the first link and the second link, and equally dividing the power for the service packets transmitted simultaneously, or allocating the power for the service packets transmitted simultaneously according to the same power spectrum density of the physical sidelink shared channel, or randomly selecting a service packet on one of the links for transmitting.

Optionally, a priority of a service packet transmitted by the first link is determined according to a level of PPPP; a priority of a service packet transmitted by the second link is determined according to a level of at least one of priority, packet delay budget, reliability, communication range and packet transmission rate in QoS indicators; and there is a preset correspondence between the level of at least one indicator in the QoS of the service packet transmitted on the second link and the priority level of the service packet transmitted on the first link;

or, priorities of service packets transmitted by the first link are higher than priorities of service packets transmitted by the second link;

or, priorities of service packets transmitted by the first link are lower than priorities of service packets transmitted by the second link;

or, priorities of some service packets transmitted by the second link are higher than a priority of any service packet transmitted by the first link, and priorities of remaining service packets transmitted by the second link are lower than the priority of any service packet transmitted by the first link.

Optionally, the processor is specifically configured for:

excluding, on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold;

if so, determining that the resources on the transmission link for the service packet to be transmitted that overlap in the time domain with resources that have been selected on the other link are not allowed to be selected;

if not, determining that the resources on the transmission link for the service packet to be transmitted that overlap in the time domain with resources that have been selected on the other link are not allowed to be selected.

Optionally, the processor is specifically configured for:

in a case that the terminal comprises one power amplifier, determining that the resources on the transmission link for the service packet to be transmitted that overlap in time domain with resources that have been selected on other link are not allowed to be selected;

or, in a case that the terminal comprises a plurality of power amplifiers, determining that the resources on the transmission link for the service packet to be transmitted that overlap in time domain with resources that have been selected on other link are allowed to be selected.

Optionally, the processor is specifically configured for:

excluding on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold, and judging whether the terminal comprises a plurality of power amplifiers;

if two judgment conditions are both met, determining that the resources on the transmission link for the service packet to be transmitted that overlap in time domain with resources that have been selected on other link are allowed to be selected;

otherwise, determining that the resources on the transmission link for the service packet to be transmitted that overlap in time domain with resources that have been selected on other link are not allowed to be selected.

Optionally, the preset threshold is a minimum quantity of resources that meet the packet delay budget and a requirement for a quantity of an initial transmission and retransmissions;

and/or, the preset threshold is determined according to a preset correspondence between a level of at least one indicator in the QoS of service packets transmitted on the second link and a priority of each service packet on the first link.

Optionally, the processor is further configured for: before selecting resources for the service packet to be transmitted, excluding resources determined to be occupied on the transmission link to obtain a second candidate resource set; wherein the second candidate resource set comprises the resources that overlap in the time domain with resources that have been selected on the other link, and the second candidate resource set corresponds to the selectable resources;

the processor is specifically configured for: selecting resources for the service packet to be transmitted from the second candidate resource set; or, screening the second candidate resource set according to a first preset screening rule, and then selecting resources for the service packet to be transmitted in the screened second candidate resource set.

Optionally, the processor is further configured for: after obtaining the second candidate resource set, for the second candidate resource set, in a case that the terminal comprises one power amplifier, traversing resources that overlap in the time domain with resources that have been selected on the other link in the second candidate resource set;

when judging that there are resources that overlap in the time domain with and have a different time slot length from the resources that have been selected on the other link, excluding the resources that overlap in the time domain with and have the different time slot length from the second candidate resource set, to obtain an updated second candidate resource set.

Optionally, the processor is further configured for: before selecting the resources that do not overlap in the time domain with resources that have been selected on the other link for the service packet to be transmitted, excluding on the transmission link for the service packet to be transmitted, resources determined to be occupied and the resources that overlap in the time domain with resources that have been selected on the other link, to obtain a first candidate resource set;

the processor is specifically configured for: selecting resources for the service packet to be transmitted in the first candidate resource set; or, screening the first candidate resource set according to a second preset screening rule, and selecting resources for the service packet to be transmitted in the screened first candidate resource set.

Optionally, the processor is further configured for: when determining that the resource multiplexing mode of the first link and the second link is time division multiplexing or a combination of time division multiplexing and frequency division multiplexing, selecting resources for the service packet to be transmitted among the time-frequency resources available on the transmission link under a sensing-based semi-persistent scheduling resource selection mode;

or, after monitoring a channel where the time-frequency resources available on the transmission link are located, excluding resources determined to be occupied on the transmission link to obtain a third candidate resource set, and judging whether each resource in the third candidate resource set meets a packet delay budget; in response to determining that each resource in the third candidate resource set meets a packet delay budget, performing resource selection and/or performing first back-off processing and then resource selection; otherwise, performing back-off processing and monitoring the channel again where the time-frequency resources available on the transmission link are located.

Optionally, the processor is specifically configured for: monitoring the channel where the time-frequency resources available on the transmission link for the service packet to be transmitted by:

decoding a control signaling transmitted in a time division multiplexing mode to obtain indication information;

or, detecting a preamble sequence to obtain indication information;

or, detecting channel energy.

In a fourth aspect, an embodiment of the application provides a data transmission device, which is applied to a terminal configured with a first link and a second link and includes:

a memory configured to store program instructions;

a processor configured to invoke the program instructions stored in the memory, and in accordance with the obtained program, perform the process of:

determining time-frequency resources for transmitting a service packet;

wherein the time-frequency resources are determined by using the above resource selection method of the first aspect as provided in the embodiments of the application;

transmitting the service packet, a preset control signaling and/or a preset preamble sequence on the determined time-frequency resources.

In a fifth aspect, an embodiment of the application provides a resource selection device, which is applied to a terminal configured with a first link and a second link and includes:

a determining unit configured to determine a transmission link for a service packet to be transmitted; wherein the first link and the second link are used to transmit different types of service packets;

a judging unit configured to judge whether resources on the transmission link for the service packet to be transmitted that overlap in time domain with resources that have been selected on other link are allowed to be selected, when determining that a resource multiplexing mode of the first link and the second link is frequency division multiplexing;

a selection unit configured to: in response to that the resources on the transmission link for the service packet to be transmitted that overlap in time domain with resources that have been selected on other link are allowed to be selected, select transmission resources for the service packet to be transmitted among time-frequency resources available on the transmission link for the service packet to be transmitted, wherein selectable resources comprise: resources that overlap in the time domain with resources that have been selected on the other link, and/or resources that do not overlap in the time domain with resources that have been selected on the other link; in response to that the resources on the transmission link for the service packet to be transmitted that overlap in time domain with resources that have been selected on other link are not allowed to be selected, select transmission resources that do not overlap in the time domain with resources that have been selected on the other link for the service packet to be transmitted among the time-frequency resources available on the transmission link for the service packet to be transmitted.

In a sixth aspect, an embodiment of the application provides a data transmission device, which is applied to a terminal configured with a first link and a second link and includes:

a determining unit configured to determine time-frequency resources for transmitting a service packet; wherein the time-frequency resources are determined by using the above resource selection method of the first aspect as provided in the embodiments of the application;

a transmitting unit configured to send the service packet, a preset control signaling and/or a preset preamble sequence on the determined time-frequency resources.

In a seventh aspect, an embodiment of the application provides a computer readable storage medium storing computer executable instructions which are configured to cause the computer to perform any one of the above-mentioned methods.

The application has the following beneficial effects.

The embodiments of the application provide a resource selection method and device, a data transmission method and device, and a computer readable storage medium. In the case of determining that the resource multiplexing mode of the first link and the second link is frequency division multiplexing, it can be further determined whether to select the resources that do not overlap in the time domain with resources that have been selected on the other link to transmit the service packet to be transmitted by judging whether it is allowed to select on the transmission link the resources that overlap in the time domain with resources that have been selected on the other link, so that the adjustment may also be performed according to actual needs on the basis of pre-configuration, thereby greatly increasing the flexibility of resource selection and the spectrum usage efficiency.

DETAILED DESCRIPTION OF THE EMBODIMENTS

The specific embodiments of a resource selection method and device, a data transmission method and device, and a computer readable storage medium provided in the embodiments of the application will be illustrated below in details with reference to the drawings. It is necessary to note that the described embodiments are only a part of the embodiments of the application, but not all the embodiments. Based upon the embodiments of the application, all of other embodiments obtained by those ordinary skilled in the art without creative work pertain to the protection scope of the application.

The terminology or resource selection mechanism involved in the embodiments of the application will be explained below.

1. 3GPP Release14 and 3GPP Release15.

The LTE-V2X sidelink communication of the 3GPP Release14 and 3GPP Release15 supports the sidelink transmission mode 3 and sidelink transmission mode 4. In mode 3, the base station schedules and allocates resources for a terminal, and in mode 4 the UE select resources autonomously. The LTE-V2X sidelink communication of 3GPP Release 14 and Release 15 only supports broadcast communication.

The transmission resources of the sidelink are configured through the bitmap for the time-domain resource configuration of the transmission resource pool. For example, the bitmap on the transmission resource pool is 0x1010101010101010, the V2X logical subframe with an index being an odd number is configured as the time-domain resource available on the transmission resource pool, and the V2X logical subframe with an index being an even index in the resource pool cannot be used to send service packets.

Figure 1:
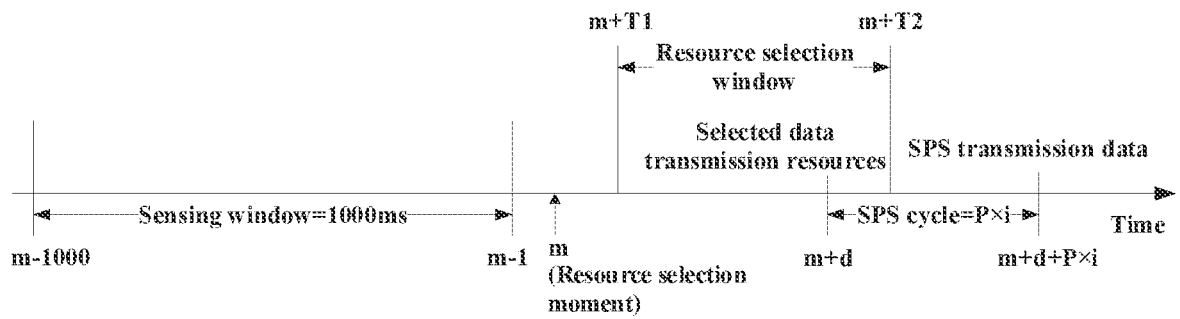
FIG. 1 is a schematic diagram of the resource distribution in the time domain in the prior art.

2. The sidelink transmission mode 4 of 3GPP Release 14 supports the Sensing-based Semi-Persistent Schedule (SPS) scheme, which can refer to the resource distribution diagram shown in FIG. 1. The selection process of transmission resources on a single carrier of the current LTE-V2X is taken as an example.

Step 1: mark all resources in the resource selection window as available.

Step 2: exclude the resources which are determined to be occupied to obtain candidate resources.

Here, the resources which are determined to be occupied can include two categories as follows.

First category: in the Sensing window, the terminal itself transmits and cannot monitor the service packets transmitted by other terminals on the transmission subframe, so this subframe can be called a skip subframe. Assuming that other terminals reserve the next resource in all cycles configured by the system on this subframe, and the reserved resource overlaps with the skip subframe or overlaps with 1, 2, ..., 10×counter-1 subframe(s) after the skip subframe, the skip subframe needs to be excluded.

Second category: the Scheduling Assignment (SA) transmitted by another terminal on the Physical Sidelink Control Channel (PSCCH) is monitored in the Sensing window, and then the period and the corresponding data resource reservation information can be learned from the SA, where the data is transmitted through the Physical Sidelink Shared Channel (PSSCH). If the reserved resources overlap with candidate resources or overlap with 1, 2, ..., 10×counter-1 transmission resources after the candidate subframe, and the Physical Sidelink Shared Channel-Reference Signal Received Power (PSSCH-RSRP) measured according to the SA is higher than a threshold, the reserved resources need to be excluded.

For illustration: if the ratio of remaining resources in the resource selection window is less than 20% after step 2, the above-mentioned threshold is increased by 3 dB, and then process 2 is re-executed until the ratio of remaining resources in the resource selection window is equal to or higher than 20%.

Step 3: perform the Sidelink-Received Signal Strength Indication (S-RSSI) measurement and sorting on the candidate resources, select 20% of resources with the lowest S-RSSI measurement value, and the higher layer performs the resource selection among 20% of the candidate resources.

3. For the sidelink transmission mode 4 of 3GPP Release 15, the process of multi-carrier resource selection is added on the basis of the Sensing+SPS resource selection mechanism of 3GPP Release 14. That is, the higher layer provides a candidate resource pool for the physical layer; the physical layer excludes resources in accordance with the step 1 and step 2 of the Sensing mechanism of 3GPP Release 14 to obtain candidate resources, then performs the S-RSSI measurement and sorting on the candidate resources, and selects and reports 20% of resources with the lowest S-RSSI measurement value to the higher layer; and then, the higher layer excludes the subframes that exceed the terminal's transmission capability and then selects the transmission resources.

Here, the subframes that exceed the terminal's transmission capability may be judged in the following ways:

(A) The number of TX chains is less than the number of configured transmission carriers;

(B) The terminal cannot support the combination of given frequency bands;

(c) TX chain switching time.

Moreover, if the transmission resources cause the terminal to fail to meet the radio frequency requirement, for example, due to the Power Spectral Density (PSD) imbalance, the terminal performs the resource selection independently for each carrier. If the resource selection result causes the number of simultaneous transmissions to exceed the transmission capability of the terminal, the resource selection process is re-executed until the resource selection result can be supported by the terminal.

In the embodiments of the application, the first link may be a sidelink of Vehicle to Everything in Internet of Vehicles of Long Term Evolution (LTE V2X sidelink), and the second link may be a sidelink of Vehicle to Everything in Internet of Vehicles of New Radio (NR V2X sidelink); or the first link may be an NR V2X sidelink, and the second link may be an LTE V2X sidelink, which is not limited here. In the following, the first link is an LTE V2X sidelink and the second link is an NR V2X sidelink as an example for illustration.

For a terminal configured with the LTE V2X sidelink and NR V2X sidelink, in order to improve the flexibility of resource selection and the spectrum usage efficiency, embodiments of this application provides a resource selection method, which is applied to the terminal side configured with the LTE V2X sidelink and NR V2X sidelink, that is to say, the executor of the steps described below is a terminal configured with the LTE V2X sidelink and NR V2X sidelink.

Specifically, the resource selection method may include the following steps.

Step 1: a terminal configured with a first link and a second link determines a transmission link for a service packet to be transmitted.

Here, the first link and the second link work on different channels, so the first link and the second link can be used to transmit different types of service packets.

For example, when the first link is an LTE V2X sidelink and the second link is an NR V2X sidelink, the LTE V2X sidelink transmits the basic safety service packets, while the NR V2X sidelink transmits the advanced V2X service packets.

Therefore, when a service packet arrives, the terminal can determine the link for transmitting the service packet according to the correspondence between the type of the service packet and the link.

Step 2: determining the resource multiplexing mode of the first link and the second link.

Here, the resource multiplexing mode may be frequency division multiplexing, time division multiplexing, or a combination of time division multiplexing and frequency division multiplexing. When it is determined that the resource multiplexing mode is frequency division multiplexing, step 3 is performed; and when it is determined that the resource multiplexing mode is time division multiplexing or a combination of time division multiplexing and frequency division multiplexing, step 7 or step 8 is performed.

Figure 2:
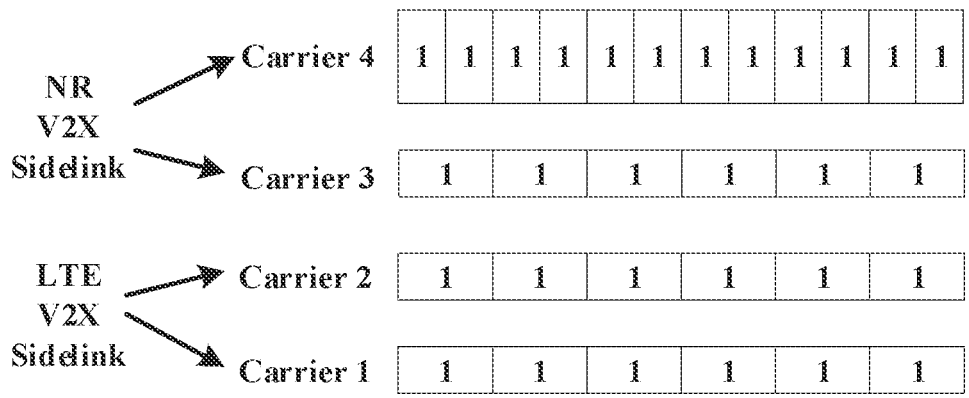
FIG. 2 is a schematic diagram of resources occupied by the first link and the second link in the frequency division multiplexing mode provided in an embodiment of the application.

It should be noted that, in embodiments of the application, for the frequency division multiplexing mode, the first link is an LTE V2X sidelink and the second link is an NR V2X sidelink as an example, as shown in FIG. 2. The time slot marked with "1" in FIG. 2 indicates a time slot that can be used as the transmission resource, that is, a time slot that can be selected to transmit the service packet to be transmitted.

As shown in FIG. 2, in this multiplexing mode, the time-frequency resources on the LTE V2X sidelink and NR V2X sidelink may be located on different channels or carriers. For example, the carriers occupied by the LTE V2X sidelink are the carrier 1 and carrier 2, and the carriers occupied by the NR V2X sidelink are the carrier 3 and carrier 4. In addition, since the frequency division multiplexing method is adopted, the resources that overlap in the time domain can be selected to send service packets on the LTE V2X sidelink and NR V2X sidelink.

Figure 3:
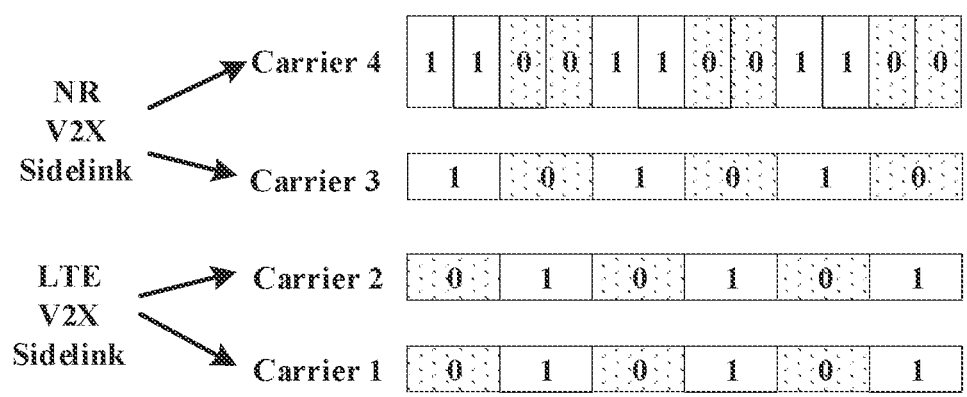
FIG. 3 is a first schematic diagram of resources occupied by the first link and the second link in the combination mode of time division multiplexing and frequency division multiplexing provided in an embodiment of the application.
Figure 4:
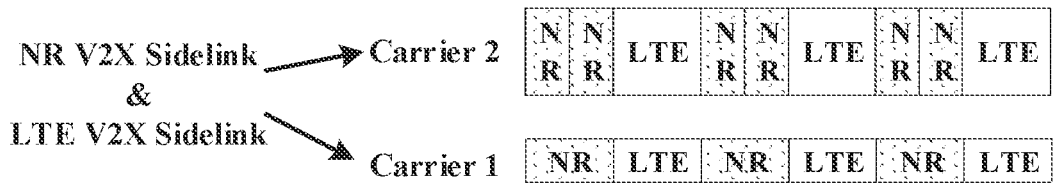
FIG. 4 is a second schematic diagram of resources occupied by the first link and the second link in the combination mode of time division multiplexing and frequency division multiplexing provided in an embodiment of the application.

For the combination mode of time division multiplexing and frequency division multiplexing, similarly the first link is an LTE V2X sidelink and the second link is an NR V2X sidelink as an example, as shown in FIGS. 3 and 4. The time slot marked with "1" in FIG. 3 indicates a time slot that can be used as the transmission resource, and the time slot marked with "0" indicates a time slot that cannot be used as the transmission resource on the current link; and the time slot marked with "NR" in FIG. 4 indicates a time slot that can be used as the transmission resource on the NR V2X sidelink, and the time slot marked with "LTE" indicates the time slot that can be used as the transmission resource on the LTE V2X sidelink.

In addition, the time-frequency resources on the LTE V2X sidelink and NR V2X sidelink may be located on different channels or carriers. As shown in FIG. 3, the carriers occupied by the LTE V2X sidelink are the carrier 1 and carrier 2, and the carriers occupied by the NR V2X sidelink are the carrier 3 and carrier 4. Alternatively, the time-frequency resources on the LTE V2X sidelink and NR V2X sidelink may be located on the same channel or carrier. As shown in FIG. 4, the carriers occupied by both the LTE V2X sidelink and the NR V2X sidelink are the carrier 1 and carrier 2.

In the combination mode of time division multiplexing and frequency division multiplexing, the time-frequency resources available on the LTE V2X sidelink and NR V2X sidelink may be configured delicately by the base station for the terminal, or adjusted and configured by the base station according to the proportion of traffic on different links in the cell, or adjusted and configured according to the proportion of traffic reported by the terminal to the base station or the proportion of traffic of the terminal monitored by the base station itself, or configured dedicatedly by the terminal according to its own needs. Since this multiplexing mode is the combination mode of time division multiplexing and frequency division multiplexing, the resources that overlap in the time domain on the LTE V2X sidelink and NR V2X sidelink cannot be selected to send service packets.

For the time division multiplexing mode, it is similar to that shown in FIG. 3 in the combination mode of time division multiplexing and frequency division multiplexing described above, but the difference from FIG. 3 is: there is no overlap of time-frequency resources in the time domain on two carriers for the LTE V2X sidelink or NR V2X sidelink.

Step 3: judging whether resources on the transmission link for the service packet to be transmitted that overlap in time domain with resources that have been selected on other link are allowed to be selected, when determining that a resource multiplexing mode of the first link and the second link is frequency division multiplexing; if so, perform step 4; if not, perform step 6.

Specifically, when this step is performed, it is necessary to firstly determine the time-frequency resources available on the transmission link for the service packet to be transmitted, wherein the time-frequency resources may be a resource pool or Bandwidth Part (BWP) on the carrier corresponding to the frequency band of the link, and the time-frequency resources may be configured by a network device (such as a base station) for the terminal or may be pre-configured by the terminal itself. In addition, the way to determine the time-frequency resources on the corresponding link can refer to the ways in the prior art, which will not be repeated here.

After determining the time-frequency resources available on the transmission link for the service packet to be transmitted, it can be judged whether resources on the transmission link for the service packet to be transmitted that overlap in the time domain with resources that have been selected for the other link are allowed to be selected. The judgment process may be implemented in three ways (first way, second way and third way) as follows.

In the first way: the judgment may be performed according to the number of resources meeting the packet delay budget, which specifically includes:

excluding, on the transmission link for the service packet to be transmitted, resources determined to be occupied and the resources that overlap in the time domain with resources that have been selected on the other link, to obtain a first candidate resource set; wherein the resources determined to be occupied may include: resources that may be occupied (such as skip subframes, that is, the terminal itself transmits and cannot monitor service packets transmitted by other terminals on the transmitting subframe, and this subframe is called skip subframe), and resources that have been already occupied or preempted by other terminals;

judging whether the number of resources meeting a packet delay budget in the first candidate resource set is less than a preset threshold;

if so, allowing to select, on the transmission link for the service packet to be transmitted, the resources that overlap in the time domain with resources that have been selected on the other link;

if not, not allowing to select the resources on the transmission link for the service packet to be transmitted that overlap in the time domain with resources that have been selected on the other link.

In the second way: the judgment may be performed according to the transmission capability of the terminal, such as according to the number of power amplifiers included in the terminal, which specifically includes:

when the terminal includes one power amplifier, it means that the terminal's transmission capability is limited, so it is not allowed to select the resources on the transmission link for the service packet to be transmitted that overlap in the time domain with resources that have been selected on the other link;

or, when the terminal includes a plurality of power amplifiers, it means that the terminal has a strong transmission capability, so it is allowed to select the resources on the transmission link for the service packet to be transmitted that overlap in the time domain with resources that have been selected on the other link.

In the third way: the judgment may be performed according to two conditions, namely the number of resources meeting the packet delay budget and the transmission capability of the terminal, which specifically includes:

excluding on the transmission link for the service packet to be transmitted, resources determined to be occupied and the resources that overlap in the time domain with resources that have been selected on the other link, to obtain a first candidate resource set;

judging whether the number of resources meeting a packet delay budget in the first candidate resource set is less than a preset threshold, and judging whether the terminal includes a plurality of power amplifiers;

if two judgment conditions are both met, allowing to select the resources on the transmission link for the service packet to be transmitted that overlap in the time domain with resources that have been selected on the other link;

otherwise (for example, only one of the two judgment conditions is satisfied, or neither of the two judgment conditions is satisfied), not allowing to select resources on the transmission link for the service packet to be transmitted that overlap in the time domain with resources that have been selected on the other link.

Optionally, the preset threshold mentioned in the above first and third ways may be set to the minimum number of resources meeting the packet delay budget and the requirement for the number of initial transmission and retransmissions, wherein the number of initial transmissions may be 1, and the number of retransmissions may be 0 or a positive integer; or, the preset threshold may also be determined according to the preset correspondence between the level of the at least one indicator in the QoS of service packets transmitted on the second link and the ProSe Per-Packet Priority (PPPP) on the first link; or, the preset threshold may also be determined according to these two factors: the minimum number of resources meeting the packet delay budget and the requirement for the number of initial transmission and retransmissions, and the preset correspondence between the level of at least one indicator in the QoS of service packets transmitted on the second link and the PPPP on the first link.

The manner in which the preset threshold is determined according to the preset correspondence between the level of at least one indicator in the QoS of service packets transmitted on the second link and the PPPP on the first link will be described in detail below.

Firstly, the correspondence between the level of at least one indicator in the QoS of service packets transmitted on the second link and the PPPP on the first link is established.

For example, based on the PPPP, the PPPP is divided into 8 priorities from 1 to 8, and then a correspondence is established between at least one indicator in the QoS and the PPPP. For example, the packet delay budget in QoS indicators are divided into 8 grades, which correspond to at least one of PPPP1-PPPP8 in the order of packet delay budgets from small to large.

After that, a value is set for each correspondence, this value is a threshold, and these thresholds can form a threshold set. For example:

packet delay budget≤3 ms, corresponding to PPPP=1, and threshold=A;

3 ms<packet delay budget≤10 ms, corresponding to PPPP=2, and threshold=B;

10 ms<packet delay budget≤20 ms, corresponding to PPPP=3, and threshold=C;

20 ms<packet del ay budget≤50 ms, corresponding to PPPP=4, and threshold=D;

50 ms<packet delay budget≤100 ms, corresponding to PPPP=5, and threshold=E;

100 ms<packet delay budget≤500 ms, corresponding to PPPP=6, and threshold=F;

500 ms<packet delay budget≤1000 ms, corresponding to PPPP=7, and threshold=G;

packet delay budget>1000 ms, corresponding to PPPP=8, and threshold=H.

Threshold set={A, B, C, D, E, F, G, H}.

When the first link is an LTE V2X sidelink and the second link is an NR V2X sidelink, if the transmission link for the service packet to be transmitted is the LTE V2X sidelink, the PPPP level of the service packet to be transmitted is determined, then the corresponding threshold is searched for in the threshold set according to this PPPP Level, and the found threshold is used as the preset threshold in the judgment condition. If the transmission link for the service packet to be transmitted is the NR V2X sidelink, the QoS indicator of the service packet to be transmitted is determined, then the corresponding threshold is searched for in the threshold set according to the QoS indicator, and the found threshold is used as the preset threshold in the judgment condition.

It should be noted that, when assigning a value for each correspondence, for the priority in QoS indicators, the higher the priority, the smaller the assigned value; for the packet delay budget in QoS indicators, the lower the packet delay budget, the smaller the assigned value; for the reliability in QoS indicators, the higher the reliability, the larger the assigned value; for the communication range in indicators, the longer the communication range, the larger the assigned value.

The manner in which the preset threshold is determined according to the minimum number of resources meeting the packet delay budget and the requirement for the number of initial transmission and retransmissions as well as the preset correspondence between the level of at least one indicator in the QoS of service packets transmitted on the second link and the PPPP on the first link will be described in detail below.

Firstly, the correspondence between the level of at least one indicator in the QoS of service packets transmitted on the second link and the PPPP on the first link is established. The establishment of the correspondence can refer to the above description, and the repetition will be omitted.

Then, for each correspondence, the minimum number of resources that meet the packet delay budget and the requirement for the number of initial transmission and retransmissions, and these minimum numbers of resources can form a resource number set.

When the first link is an LTE V2X sidelink and the second link is an NR V2X sidelink, if the transmission link for the service packet to be transmitted is the LTE V2X sidelink, the PPPP level of the service packet to be transmitted is determined, then the corresponding minimum resource number is searched for in the resource number set according to this PPPP Level, and the found minimum resource number is used as the preset threshold in the judgment condition; and if the transmission link for the service packet to be transmitted is the NR V2X sidelink, the QoS indicator of the service packet to be transmitted is determined, then the corresponding minimum resource number is searched for in the resource number set according to the QoS indicator, and the found minimum resource number is used as the preset threshold in the judgment condition.

It should be noted that, when assigning a values to each correspondence, for the priority in QoS indicators, the higher the priority, the smaller the minimum number of resources meeting the packet delay budget and the requirement for the number of initial transmission and retransmissions. For the delay in QoS indicators, the lower the delay, the smaller the minimum number of resources meeting the packet delay budget and the requirement for the number of initial transmission and retransmissions.

In the embodiment of the application, in any one of three ways described above, it can be judged whether it is allowed to select the resources on the transmission link for the service packet to be transmitted that overlap in the time domain with resources that have been selected on the other link, so that it can be determined according to the judgment result whether the resources that overlap in the time domain with resources that have been selected on the other link can be selected for the service packet to be transmitted, so as to send out the service packet to be transmitted, greatly increasing the flexibility of resource selection and the spectrum usage efficiency.

Step 4: selecting resources for the service packet to be transmitted among the time-frequency resources available on the transmission link for the service packet to be transmitted, wherein the selectable resources may include: resources that overlap in the time domain with resources that have been selected on the other link, and/or resources that do not overlap in the time domain with resources that have been selected on the other link.

Specifically, in order to be able to select resources for the service packet to be transmitted, in an embodiment of the application, before selecting resources for the service packet to be transmitted, it is also necessary to determine a second candidate resource set on the transmission link for the service packet to be transmitted, wherein the second candidate resource set does not include the resources determined to be occupied on the transmission link (the resources determined to be occupied can refer to the description in the foregoing content), so the resources determined to be occupied need to be excluded from the time-frequency resources available on the transmission link to obtain the second candidate resource set. Please note that the second candidate resource set may include resources that overlap in the time domain with resources that have been selected on the other link, and may also include resources that do not overlap in the time domain with resources that have been selected on the other link, that is to say, the second candidate resource set may correspond to the selectable resources in step 4.

In addition, in order to be able to select the transmission resources for the service packet to be transmitted as soon as possible, in an embodiment of the application, the obtained second candidate resource set may be updated at first, and the update process is related to the time slot length of the resources that overlap in the time domain with the resources that have been selected on the other link, that is to say, the update process is related to the time slot length of each resource that overlaps in the time domain.

Optionally, for the second candidate resource set, if the terminal includes one power amplifier, the resources that overlap in the time domain with resources that have been selected on the other link are traversed in the second candidate resource set, and it is judged whether there are resources that overlap in the time domain with and have a different time slot length from the resources that have been selected on the other link.

If so, the resources that overlap in the time domain with and have a different time slot length from the resources that have been selected on the other link are excluded from the second candidate resource set, to obtain the updated second candidate resource set.

If not, there is no need to perform any operation on the second candidate resource set, and the original second candidate resource set is still retained.

Through this update process, when the terminal includes one power amplifier, the resources that overlap in the time domain with and have a different time slot length from the resources that have been selected on the other link can be excluded at first, so that the number of judgments is reduced, the amount of calculation is reduced and the processing speed is increased in the process of selecting resources for the service packet to be transmitted and subsequently allocating the power, thereby transmitting out the service packet quickly and effectively, speeding up the interaction and improving the user experience.

Optionally, in an embodiment of the application, when selecting resources for the service packet to be transmitted from the time-frequency resources available on the transmission link for the service packet to be transmitted, it is possible to select resources for the service packet to be transmitted directly from the second candidate resource set; of course, it is also possible to firstly screen the second candidate resource set according to a first preset screening rule to obtain the screened second candidate resource set, and then select resources for the service packet to be transmitted from the screened second candidate resource set, so as to ensure the normal transmission of the service packet.

Here, the first preset screening rule may be: after the power of each resource is smoothed by the S-RSSI algorithm in the second candidate resource set, a certain proportion of resources with lower power ranking are selected to form the screened second candidate resource set; or, the resources that do not satisfy the terminal's transmission capability are excluded from the second candidate resource set to obtain the screened second candidate resource set; or, after the power of each resource is smoothed by the S-RSSI algorithm in the second candidate resource set, a certain proportion of resources with lower power ranking are selected, and then the resources that do not satisfy the terminal's transmission capability are excluded to obtain the screened second candidate resource set; or, the resources that do not satisfy the terminal's transmission capability are excluded at first, and then a certain proportion of resources with lower power ranking are selected after the power of each resource after the exclusion process is smoothed by the S-RSSI algorithm. Of course, examples are illustrated here, and the rule can be determined according to specific conditions in actual situations, which is not limited here.

It needs to be pointed out that, it is determined in step 3 that the it is allowed to select the resources on the transmission link for the service packet to be transmitted that overlap in the time domain with resources that have been selected on the other link, indicating that at this time the resources that overlap in the time domain with resources that have been selected on the other link can be selected, or the resources that do not overlap in the time domain with resources that have been selected on the other link can be selected, or both the resources that overlap in the time domain with resources that have been selected on the other link and the resources that do not overlap in the time domain with resources that have been selected on the other link are selected. That is to say, the selection can be performed based on specific actual conditions, which is not limited here. It should be noted that, when the terminal has only one power amplifier, due to the limited transmission capability of the terminal, it is necessary to select the resources that overlap in the time domain with resources that have been selected on the other link to ensure the normal transmission of the service packet.

However, in actual situations, the NR V2X sidelink and LTE V2X sidelink may transmit service packets through different communication modules, causing the problem of mutual interference inside the terminal and between the two links; and at the same time, the more complicated interference situation is caused due to the difference in physical channel structure between the NR V2X sidelink and LTE V2X sidelink, for example, the service transmission is performed through subframes with length of 1 ms on the LTE V2X sidelink, and the service transmission is performed through time slot with length of 0.5 ms or 0.25 ms on the NR V2X sidelink.

In addition, when selecting the resources that overlap in the time domain with resources that have been selected on the other link to transmit the service packet to be transmitted, the mutual interference will be inevitably produced between the overlapping resources, thereby affecting the normal transmission of the service packet.

Therefore, in an embodiment of the application, in order to avoid the interference and ensure the normal transmission of the service packet, after step 4 is performed, the transmission conditions (such as transmission power and/or transmission sequence) need to be adjusted. The details can refer to step 5.

Step 5: performing the power allocation or transmitting order adjustment on service packets to be transmitted on resources that overlap in the time domain on the first link and the second link respectively according to the priorities of the service packets to be transmitted on the resources that overlap in the time domain on the first link and the second link; then perform step 9.

Specifically, in an embodiment of the application, when performing the power allocation or transmitting order adjustment on service packets to be transmitted on resources that overlap in the time domain on the first link and the second link respectively, the adjustment or power allocation may be performed according to the priorities of the service packets to be transmitted on the resources that overlap in the time domain on the first link and the second link, while the judgment for the priorities of the service packets to be transmitted on the resources that overlap in the time domain on the first link and the second link may be determined according to the preset configuration, such as the first configuration mode and the second configuration mode described below, and of course, it is not limited thereto.

In the first configuration mode, the priority of a service packet transmitted by the first link may be determined according to the level of PPPP; the priority of a service packet transmitted by the second link may be determined according to the level of at least one indicator of priority, packet delay budget, reliability, communication range and packet transmission rate in QoS; and there is a preset correspondence between the level of at least one indicator in the QoS of the service packet transmitted on the second link and the priority level of the service packet transmitted on the first link.

For example, based on the PPPP on LTE V2X sidelink, the PPPP is divided into 8 priorities from 1 to 8.

At least one of the following correspondences is formed between QoS indicators of services transmitted on the NR V2X sidelink and the PPPP.

1. Packet delay budget in QoS: dividing the packet delay budget into 8 grades, which correspond to at least one of PPPP1-PPPP8 in the order of packet delay budgets from small to large, for example:

packet delay budget≤3 ms, corresponding to PPPP=1;

3 ms<packet delay budget≤10 ms, corresponding to PPPP=2;

10 ms<packet delay budget≤20 ms, corresponding to PPPP=3;

20 ms<packet delay budget≤50 ms, corresponding to PPPP=4;

50 ms<packet delay budget≤100 ms, corresponding to PPPP=5;
100 ms<packet delay budget≤500 ms, corresponding to PPPP=6;
500 ms<packet delay budget≤1000 ms, corresponding to PPPP=7;
packet delay budget>1000 ms, corresponding to PPPP=8.

2. Reliability in QoS: dividing the reliability into 8 grades, which correspond to at least one of PPPP1-PPPP8 in the order of reliability from high to low, for example:
reliability≥99.999%, corresponding to PPPP=1;
99.99%≤reliability<99.999%, corresponding to PPPP=2;
99.9%≤reliability<99.99%, corresponding to PPPP=3;
99%≤reliability<99.9%, corresponding to PPPP=4;
95%≤reliability<99%, corresponding to PPPP=5;
90%≤reliability<95%, corresponding to PPPP=6;
80%≤reliability<90%, corresponding to PPPP=7;
reliability<80%, corresponding to PPPP=8.

3. Priority in QoS: dividing the priority into 8 grades, which correspond to at least one of PPPP1 to PPPP8 in the order of priority from high to low; the correspondence between the priority in QoS and PPPP is similar to the above, and can specifically refer to the above correspondence, which will not be repeated here.

4. Minimum communication range requirement in QoS indicators: dividing the minimum communication range into 8 grades, which correspond to at least one of PPPP1-PPPP8 in the order of minimum communication range from large to small or from small to large or according to the correspondence between service attributes and other indicators. The correspondence between the minimum communication range requirement in QoS and the PPPP is similar to the above, and can specifically refer to the above correspondence, which will not be repeated here.

For another example, at first, one of the QoS indicators of the services transmitted on the NR V2X sidelink is used as a base, and such indicator is defined as a base indicator, where the base indicator is divided into several priority levels. For example, the packet delay budget in QoS is determined as the base indicator, where the packet delay budget is divided into 8 priority levels, which are packet delay budget≤3 ms, 10 ms<packet delay budget≤20 ms, 20 ms<packet delay budget≤50 ms, 50 ms<packet delay budget≤100 ms, 100 ms<packet delay budget≤500 ms, 500 ms<packet delay budget≤1000 ms, and packet delay budget>1000 ms.

Then, the PPPPs on the LTE V2X sidelink correspond to at least one of the base indicators in turn, and the other indicators in the QoS of the services transmitted on the NR V2X sidelink also correspond to at least one of the base indicators in turn, to obtain a correspondence similar to that in the above example, for example:

for the PPPP on the LTE V2X sidelink, when the packet delay budget in QoS is determined as the base indicator, the correspondence may be:
PPPP=1, corresponding to packet delay budget≤3 ms;
PPPP=2, corresponding to 3 ms<packet delay budget≤10 ms;
PPPP=3, corresponding to 10 ms<packet delay budget≤20 ms;
PPPP=4, corresponding to 20 ms<packet delay budget≤50 ms;
PPPP=5, corresponding to 50 ms<packet delay budget≤100 ms;
PPPP=6, corresponding to 100 ms<packet delay budget≤500 ms;
PPPP=7, corresponding to 500 ms<packet delay budget≤1000 ms;
PPPP=8, corresponding to packet delay budget>1000 ms.

For the reliability in QoS of the service transmitted on the NR V2X sidelink, when the packet delay budget in the QoS is determined as the base indicator, the correspondence may be:
reliability≥99.999%, corresponding to packet delay budget≤3 ms;
99.99%≤reliability<99.999%, corresponding to 3 ms<packet delay budget≤10 ms;
99.9%≤reliability<99.99%, corresponding to 10 ms<packet delay budget≤20 ms;
99%≤reliability<99.9%, corresponding to 20 ms<packet delay budget≤50 ms;
95%≤reliability<99%, corresponding to 50 ms<packet delay budget≤100 ms;
90%≤reliability<95%, corresponding to 100 ms<packet delay budget≤500 ms;
80%≤reliability<90%, corresponding to 500 ms<packet delay budget≤1000 ms;
reliability<80%, corresponding to packet delay budget>1000 ms.

The correspondence between other indicators in the QoS of the service transmitted on the NR V2X sidelink and the base indicators is similar to the above, and the details can refer to the above correspondence, which will not be repeated here.

Through the above configuration mode, the priorities of the service packets transmitted on the first link and the second link can be determined according to the obtained correspondence, which is beneficial to adjust the power or transmitting order of the service packets transmitted on the resources that overlap in the time domain according to the determination result, to ensure the normal transmission of the service packets while avoiding the mutual interference among the service packets transmitted by the resources that overlap in the time domain.

Second configuration mode: this configuration mode is different from the first configuration mode. In this configuration mode, the priorities of service packets transmitted on each link can be set directly without determining the correspondence.

For example, the priorities of service packets transmitted by the first link are directly set to be higher than the priorities of service packets transmitted by the second link; or, the priorities of service packets transmitted by the first link are directly set to be lower than the priorities of service packets transmitted by the second link; or, the priorities of some service packets transmitted by the second link are directly set to be higher than the priority of any service packet transmitted by the first link, and the priorities of remaining service packets transmitted by the second link are directly set to be lower than the priority of any service packet transmitted by the first link.

Through this configuration mode, the priorities of the service packets transmitted on each link can be directly and quickly determined, thereby reducing the amount of calculation of the terminal, increasing the processing speed of the terminal, realizing the fast and effective transmission of the service packets, and improving the user experience.

Specifically, in an embodiment of the application, after the priorities of the service packets transmitted on each link is determined in the foregoing configuration mode, the corresponding adjustment can be made according to the determination result.

Optionally, if the priorities of the service packets transmitted by the resources that overlap in the time domain on the first link and the second link are different, the power that meets the packet delay budget is allocated to the service packets with high priority, that is, it is ensured preferentially that the service packets with high priority obtain the reliable transmission power, while the power reduction, dropping transmission or resource re-selection is performed on the service packets with low priority, wherein the resource re-selection may be understood as re-executing the process from step 1 to step 5 above, so as to re-select resources for the service packets with low priority.

Optionally, if it is determined that the priorities of the service packets transmitted by the resources that overlap in the time domain on the first link and the second link are the same, the power allocation or transmitting order adjustment is performed on the service packets to be transmitted on resources that overlap in the time domain on the first link and the second link according to the number of power amplifiers of the terminal.

Here, when the terminal includes a plurality of power amplifiers, the service packets are transmitted simultaneously through the resources that overlap in the time domain on the first link and the second link, and the power for transmitting the service packets simultaneously are divided equally, for example, when there are two service packets transmitted by the resources that overlap in the time domain, the two service packets have the same transmission power; or the power for transmitting the service packets simultaneously is allocated according to the same power spectrum density of the physical sidelink shared channel, to ensure the normal transmission of service packets.

When the terminal includes one power amplifier, it is necessary to judge whether the time slot lengths of the resources that overlap in the time domain on the first link and the second link are the same; if not, indicating that the time slot lengths of the resources that overlap in the time domain are different, then the resources with the shorter time slot length among the resources that overlap in the time domain on the first link and the second link can be selected to transmit service packets preferentially; if so, indicating that the time slot lengths of the resources that overlap in the time domain are the same, then the resources that overlap in the time domain on the first link and the second link can send service packets simultaneously, and the power for transmitting the service packets simultaneously are divided equally, or the power for transmitting the service packets simultaneously is allocated according to the same power spectrum density of the physical sidelink shared channel, or a service packet on one of the links is randomly selected for transmitting. Since the terminal's transmission capacity is limited, the service packets on the other link will not be transmitted.

Step 6: selecting resources that do not overlap in the time domain with resources that have been selected on the other link for the service packet to be transmitted among the time-frequency resources available on the transmission link; and then perform step 9.

Specifically, in order to be able to select the resources that do not overlap in the time domain with resources that have been selected on the other link, in an embodiment of the application, it is necessary to firstly determine a first candidate resource set that does not include resources that do not overlap in the time domain with resources that have been selected on the other link, and the first candidate set does not include resources determined to be occupied on the transmission link for the service packet to be transmitted, wherein the way to determine the first candidate resource set can refer to the foregoing content, and the repetition will be omitted.

Optionally, since the first candidate resource set itself does not include resources that do not overlap in the time domain with resources that have been selected on the other link, when selecting resources for the service packet to be transmitted, it is possible to select resources for the service packet to be transmitted directly from the first candidate resource set; or the first candidate resource set is firstly screened according to a second preset screening rule, and then the resources for transmitting the service packet are selected directly from the screened first candidate resource set, so as to ensure the normal transmission of the service packet.

Here, the second preset screening rule can be set to be the same as the first preset screening rule mentioned in the above, and of course, it can also be set to be different. The second preset screening rule can be set according to the actual situation, which is not limited here.

Step 7: selecting resources for the service packet to be transmitted among the time-frequency resources available on the transmission link under a sensing-based semi-persistent scheduling resource selection mode; and then perform step 9.

Here, the sensing-based semi-persistent scheduling resource selection mode can refer to the resource selection mechanism supporting Sensing+SPS of the sidelink transmission mode 4 of 3GPP Release 14 introduced in the foregoing content, and the repetition will be omitted.

Step 8: after monitoring a channel where the time-frequency resources available on the transmission link are located, excluding resources determined to be occupied on the transmission link to obtain a third candidate resource set, and judging whether each resource in the third candidate resource set meets the packet delay budget; if so, performing the resource selection and/or performing the back-off processing and then resource selection; otherwise, performing the back-off processing and then monitoring the channel again where the time-frequency resources available on the transmission link are located; and then perform step 9.

Here, monitoring the channel where the time-frequency resources available on the transmission link are located again may be understood as re-executing the process of step 8.

In addition, when monitoring the channel where the time-frequency resources available on the transmission link are located, what is monitored is the channel occupancy status of the channel currently and in the future. Furthermore, when the channel monitoring mode is selected, any one or a combination of the following modes can be used: decoding a control signaling transmitted in a time division multiplexing mode to obtain the indication information; detecting a preamble sequence to obtain the indication information; and detecting the channel energy. Those resources that are determined to be occupied can be excluded through monitoring, to thereby obtain the third candidate resource set, wherein the specific decoding mode and detection mode can refer to the prior art, which will not be repeated here.

It should be noted that, in an embodiment of the application, the time-frequency resources available on the transmission link may be the resource pool or BWP on the carrier of the frequency band on the transmission link for the service packet to be transmitted, and the determined resource pool or BWP forms the time-frequency resources available on the transmission link for the service packet to be transmitted. In addition, the time-frequency resources available on the transmission link include the aforementioned resources that are determined to be occupied, and the resources that overlap in the time domain with resources that have been selected on the other link.

Step 9: transmitting out the service packet on the selected resources.

Of course, the preset control signaling and/or the preset preamble sequence can also be transmitted out together while transmitting the service packet, to ensure that the receiving side can receive the service packet normally, and ensure the normal service transmission between the transmitting side and the receiving side.

Figure 5:
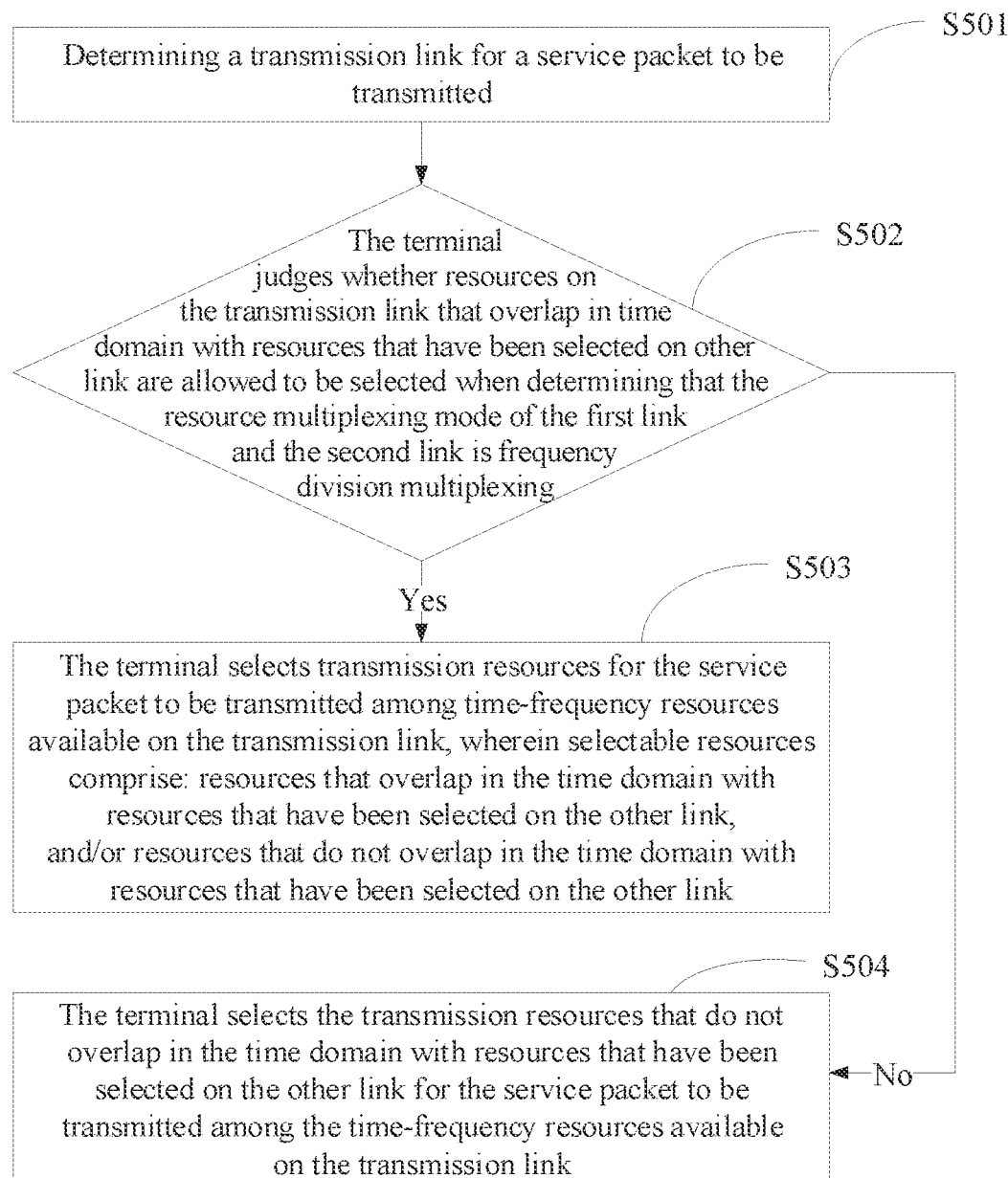
FIG. 5 is a flowchart of a resource selection method provided in an embodiment of the application.

Based on the same inventive concept, an embodiment of the application further provides a resource selection method, which is applied to a terminal configured with a first link and a second link, and as shown in FIG. 5, the method may include the following.

S501: determining a transmission link for a service packet to be transmitted.

Here, the first link and the second link are used to transmit different types of service packets; and in an embodiment of the application, when the first link is LTE V2X sidelink and the second link is NR V2X sidelink, the LTE V2X sidelink transmits the service packets of basic road safety type, and the NR V2X sidelink transmits the advanced V2X service packets.

S502: the terminal judges whether resources on the transmission link for the service packet to be transmitted that overlap in time domain with resources that have been selected on other link are allowed to be selected, when determining that a resource multiplexing mode of the first link and the second link is frequency division multiplexing the transmission link for the service packet to be transmitted; if so, perform step S503; if not, perform step S504.

Here, the resource multiplexing mode may be frequency division multiplexing, time division multiplexing, or a combination of time division multiplexing and frequency division multiplexing.

S503: the terminal selects resources for the service packet to be transmitted among the time-frequency resources available on the transmission link for the service packet to be transmitted, where the selectable resources include: resources that overlap in the time domain with resources that have been selected on the other link, and/or resources that do not overlap in the time domain with resources that have been selected on the other link the transmission link for the service packet to be transmitted.

S504: the terminal selects the resources that do not overlap in the time domain with resources that have been selected on the other link for the service packet to be transmitted among, the time-frequency resources available on the transmission link for the service packet to be transmitted.

Thus, in the case of determining that the resource multiplexing mode of the first link and the second link is frequency division multiplexing, it can be further determined whether to select the resources that do not overlap in the time domain with resources that have been selected on the other link to transmit the service packet to be transmitted by judging whether it is allowed to select on the transmission link the resources that overlap in the time domain with resources that have been selected on the other link, so that the adjustment may also be performed according to actual needs on the basis of pre-configuration, thereby greatly increasing the flexibility of resource selection and the spectrum usage efficiency.

Optionally, after the step S503 of selecting resources for the service packet to be transmitted in the embodiment of the application, the method may further include:

the terminal performs the power allocation or transmitting order adjustment on service packets to be transmitted on resources that overlap in the time domain on the first link and the second link respectively, according to priorities of the service packets to be transmitted on the resources that overlap in the time domain on the first link and the second link.

Therefore, the mutual interference between overlapping resources in the time domain can be effectively avoided, and the normal transmission of service packets can be ensured.

Optionally, in an embodiment of the application, the step in which the terminal performs the power allocation or transmitting order adjustment on service packets to be transmitted on resources that overlap in the time domain on the first link and the second link respectively according to the priorities of the service packets to be transmitted on the resources that overlap in the time domain on the first link and the second link, specifically includes:

if the priorities of the service packets to be transmitted on the resources that overlap in the time domain on the first link and the second link are different, allocating power that meets a packet delay budget to a service packet with high priority, and performing power reduction, dropping transmission or resource re-selection for a service packet with low priority;

or, if determining that the priorities of the service packets to be transmitted on the resources that overlap in the time domain on the first link and the second link are same, performing the power allocation or transmitting order adjustment on the service packets to be transmitted on resources that overlap in the time domain on the first link and the second link according to a quantity of power amplifiers of the terminal.

Therefore, the power allocation or transmitting order adjustment can be performed on the service packets to be transmitted on resources that overlap in the time domain, which is beneficial to avoid the mutual interference among resources that overlap in the time domain.

Optionally, in an embodiment of the application, performing the power allocation or transmitting order adjustment on the service packets to be transmitted on resources that overlap in the time domain on the first link and the second link according to the number of power amplifiers of the terminal, specifically includes:

in a case that the terminal comprises a plurality of power amplifiers, transmitting service packets simultaneously through the resources that overlap in the time domain on the first link and the second link, and equally dividing transmission power for the service packets transmitted simultaneously, or allocating the transmission power for the service packets transmitted simultaneously according to a same power spectrum density of a physical sidelink shared channel;

or, in a case that the terminal comprises one power amplifier, judging whether time slot lengths of the resources that overlap in the time domain on the first link and the second link are same;

in response to determining that time slot lengths of the resources that overlap in the time domain on the first link and the second link are not same, selecting resources with a shorter time slot length among the resources that overlap in the time domain on the first link and the second link to transmit service packets preferentially;

in response to determining that time slot lengths of the resources that overlap in the time domain on the first link and the second link are same, transmitting service packets simultaneously through the resources that overlap in the time domain on the first link and the second link, and equally dividing the power for the service packets transmitted simultaneously, or allocating the power for the service packets transmitted simultaneously according to the same power spectrum density of the physical sidelink shared channel, or randomly selecting a service packet on one of the links for transmitting.

Therefore, the power adjustment mode and the transmitting order adjustment mode can be determined according to the transmission capability of the terminal, which is beneficial for the normal transmission of the service packet to be transmitted.

Optionally, in an embodiment of the application, the priority of a service packet transmitted by the first link is determined according to the level of PPPP; a priority of a service packet transmitted by the second link is determined according to a level of at least one indicator of priority, packet delay budget, reliability, communication range and packet transmission rate in Quality of Service, QoS; and there is a preset correspondence between the level of the at least one indicator in the QoS of the service packet transmitted on the second link and a priority level of the service packet transmitted on the first link;

or, priorities of service packets transmitted by the first link are higher than priorities of service packets transmitted by the second link;

or, priorities of service packets transmitted by the first link are lower than priorities of service packets transmitted by the second link;

or, priorities of some service packets transmitted by the second link are higher than a priority of any service packet transmitted by the first link, and priorities of remaining service packets transmitted by the second link are lower than the priority of any service packet transmitted by the first link.

Therefore, it can be beneficial to judge the order of the priorities of the service packets transmitted on the two links, and it is beneficial to adjust the power or the transmitting order.

Optionally, the step S502 of judging whether resources on the transmission link for the service packet to be transmitted that overlap in time domain with resources that have been selected on other link are allowed to be selected in the embodiment of the application specifically includes:

excluding, on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold;

in response to determining that the quantity of resources meeting a packet delay budget in the first candidate resource set is less than a preset threshold, the resources on the transmission link for the service packet to be transmitted that overlap in the time domain with resources that have been selected on the other link are allowed to be selected;

in response to determining that the quantity of resources meeting a packet delay budget in the first candidate resource set is not less than a preset threshold, the resources on the transmission link for the service packet to be transmitted that overlap in the time domain with resources that have been selected on the other link are not allowed to be selected.

Therefore, whether it is allowed to select resources that overlap in the time domain with resources that have been selected on the other link can be determined by judging the number of resources meeting the packet delay budget.

Optionally, the step S502 of judging whether resources on the transmission link for the service packet to be transmitted that overlap in time domain with resources that have been selected on other link are allowed to be selected in the embodiment of the application specifically includes:

when the terminal includes one power amplifier, the resources on the transmission link for the service packet to be transmitted that overlap in time domain with resources that have been selected on other link are not allowed to be selected;

or, when the terminal includes a plurality of power amplifiers, the resources on the transmission link for the service packet to be transmitted that overlap in time domain with resources that have been selected on other link are allowed to be selected.

Therefore, whether it is allowed to select resources that overlap in the time domain with resources that have been selected on the other link can be determined by judging the number of power amplifiers included in the terminal.

Optionally, the step S502 of judging whether the transmission link is allowed to select resources that overlap in the time domain with resources that have been selected on the other link in the embodiment of the application specifically includes:

excluding on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold, and judging whether the terminal comprises a plurality of power amplifiers;

in response to that two judgment conditions are both met, the resources on the transmission link for the service packet to be transmitted that overlap in time domain with resources that have been selected on other link are allowed to be selected;

otherwise, the resources on the transmission link for the service packet to be transmitted that overlap in time domain with resources that have been selected on other link are not allowed to be selected.

Therefore, whether it is allowed to select resources that overlap in the time domain with resources that have been selected on the other link can be determined by two judgment conditions, i.e., judging the number of resources meeting the packet delay budget and the number of power amplifiers included in the terminal.

Optionally, in an embodiment of the application, the preset threshold is the minimum number of resources that meet the packet delay budget and a requirement for the number of initial transmission and retransmissions;

and/or, the preset threshold is determined according to a preset correspondence between a level of at least one indicator in the QoS of service packets transmitted on the second link and a priority of each service packet on the first link.

Therefore, the preset threshold can be determined, which helps to determine whether it is allowed to select the resources that overlap in the time domain with resources that have been selected on the other link.

Optionally, before the step S503 of selecting resources for the service packet to be transmitted in the embodiment of the application, the method may further include:

excluding resources determined to be occupied on the transmission link to obtain a second candidate resource set; wherein the second candidate resource set includes the resources that overlap in the time domain with resources that have been selected on the other link.

The step S503 of selecting resources for the service packet to be transmitted among time-frequency resources available on the transmission link in the embodiment of the application specifically includes:

selecting resources for the service packet to be transmitted from the second candidate resource set;

or, screening the second candidate resource set according to a first preset screening rule, and then selecting resources for the service packet to be transmitted in the screened second candidate resource set.

Therefore, the effective resources can be selected for the service packet to be transmitted, so as to ensure the effective transmission of the service packet to be transmitted.

Optionally, in an embodiment of the application, after obtaining the second candidate resource set, the method further includes:

for the second candidate resource set, if the terminal includes one power amplifier, traversing resources that overlap in the time domain with resources that have been selected on the other link in the second candidate resource set;

in response to determining that there are resources that overlap in the time domain with and have a different time slot length from the resources that have been selected on the other link, excluding the resources that overlap in the time domain with and have the different time slot length from the second candidate resource set, to obtain an updated second candidate resource set.

Therefore, the update of the second candidate resource set can be implemented, so that the amount of calculation is reduced, the processing speed is increased, and the fast and effective transmission of the service packet to be transmitted is ensured when the resources are selected for the service packet to be transmitted.

Optionally, before the step S504 of selecting the resources that do not overlap in the time domain with resources that have been selected on the other link for the service packet to be transmitted in the embodiment of the application, the method further includes:

excluding on the transmission link for the service packet to be transmitted, resources determined to be occupied and the resources that overlap in the time domain with resources that have been selected on the other link, to obtain a first candidate resource set.

The step S504 of selecting resources that do not overlap in the time domain with resources that have been selected on the other link for the service packet to be transmitted among the time-frequency resources available on the transmission link in the embodiment of the application specifically includes:

selecting resources for transmitting the service packet in the first candidate resource set;

or, screening the first candidate resource set according to a second preset screening rule, and then selecting resources for transmitting the service packet in the screened first candidate resource set.

Therefore, the effective transmission resources can be selected for the service packet to be transmitted, so as to ensure the effective transmission of the service packet to be transmitted.

Optionally, in an embodiment of the application, when determining that the resource multiplexing mode of the first link and the second link is time division multiplexing or a combination of time division multiplexing and frequency division multiplexing, the method further includes:

selecting resources for the service packet to be transmitted among the time-frequency resources available on the transmission link in sensing-based semi-persistent scheduling resource selection mode;

or, after monitoring a channel where the time-frequency resources available on the transmission link are located, excluding resources determined to be occupied on the transmission link to obtain a third candidate resource set, and judging whether each resource in the third candidate resource set meets a packet delay budget; in response to determining that each resource in the third candidate resource set meets a packet delay budget, performing resource selection and/or performing first back-off processing and then resource selection; otherwise, performing back-off processing and monitoring the channel again where the time-frequency resources available on the transmission link are located.

Therefore, the effective transmission resources can also be selected for the service packet to be transmitted to ensure the effective transmission of the service packet to be transmitted when determining that the resource multiplexing mode is time division multiplexing or a combination of time division multiplexing and frequency division multiplexing.

Optionally, in an embodiment of the application, the mode of monitoring the channel where the time-frequency resources available on the transmission link are located specifically includes:

decoding a control signaling transmitted in a time division multiplexing mode to obtain the indication information;

or, detecting a preamble sequence to obtain the indication information;

or, detecting the channel energy.

Therefore, the channel where the time-frequency resources available on the transmission link are located can be effectively monitored, which helps to select transmission resources for the service packet to be transmitted.

Figure 6:
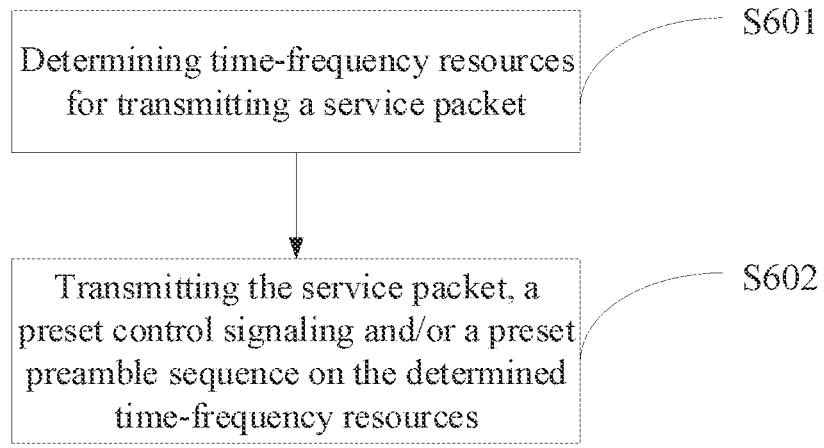
FIG. 6 is a flowchart of a data transmission method provided in an embodiment of the application.

Based on the same inventive concept, an embodiment of the application further provides a data transmission method as shown in FIG. 6, which may include the following.

S601: determining time-frequency resources for transmitting a service packet.

Here, the time-frequency resources are determined by using the above-mentioned resource selection method as provided in the embodiments of the application.

S602: transmitting the service packet, a preset control signaling and/or a preset preamble sequence on the determined time-frequency resources.

Figure 7:
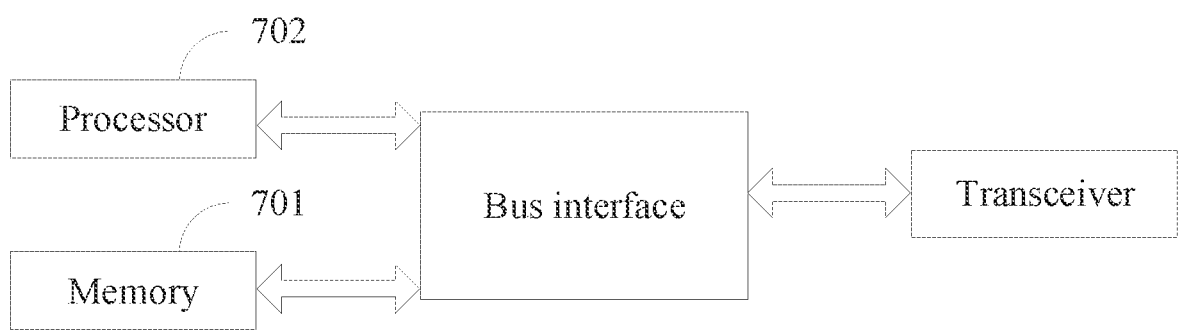
FIG. 7 is a structural schematic diagram of a first resource selection device provided in an embodiment of the application.

Based on the same inventive concept, an embodiment of the application further provides a resource selection device, which is applied to a terminal configured with a first link and a second link, and as shown in FIG. 7, which may include:

a memory 701 configured to store program instructions;

a processor 702 configured to invoke the program instructions stored in the memory 701, and in accordance with the obtained program, perform the process of:

determining a transmission link for a service packet to be transmitted; wherein the first link and the second link are used to transmit different types of service packets;

judging whether resources on the transmission link for the service packet to be transmitted that overlap in time domain with resources that have been selected on other link are allowed to be selected, when determining that a resource multiplexing mode of the first link and the second link is frequency division multiplexing;

if so, selecting transmission resources for the service packet to be transmitted among time-frequency resources available on the transmission link for the service packet to be transmitted, wherein selectable resources comprise: resources that overlap in the time domain with resources that have been selected on the other link, and/or resources that do not overlap in the time domain with resources that have been selected on the other link;

if not, selecting transmission resources that do not overlap in the time domain with resources that have been selected on the other link for the service packet to be transmitted among the time-frequency resources available on the transmission link for the service packet to be transmitted.

Optionally, in an embodiment of the application, the processor 702 is further configured for: after selecting resources for the service packet to be transmitted, performing power allocation or transmitting order adjustment on service packets to be transmitted on resources that overlap in the time domain on the first link and the second link respectively, according to priorities of the service packets to be transmitted on the resources that overlap in the time domain on the first link and the second link.

Optionally, in an embodiment of the application, the processor 702 is specifically configured for:

if the priorities of the service packets to be transmitted on the resources that overlap in the time domain on the first link and the second link are different, allocating power that meets a packet delay budget to a service packet with high priority, and performing power reduction, dropping transmission or resource re-selection for a service packet with low priority;

or, if determining that the priorities of the service packets to be transmitted on the resources that overlap in the time domain on the first link and the second link are same, performing the power allocation or transmitting order adjustment on the service packets to be transmitted on resources that overlap in the time domain on the first link and the second link according to a quantity of power amplifiers of the terminal.

Optionally, in an embodiment of the application, the processor 702 is specifically configured for:

in a case that the terminal comprises a plurality of power amplifiers, transmitting service packets simultaneously through the resources that overlap in the time domain on the first link and the second link, and equally dividing transmission power for the service packets transmitted simultaneously, or allocating the transmission power for the service packets transmitted simultaneously according to a same power spectrum density of a physical sidelink shared channel;

or, in a case that the terminal comprises one power amplifier, judging whether time slot lengths of the resources that overlap in the time domain on the first link and the second link are same;

if not, selecting resources with a shorter length in time domain among the resources that overlap in the time domain on the first link and the second link to transmit service packets preferentially;

if so, transmitting service packets simultaneously through the resources that overlap in the time domain on the first link and the second link, and equally dividing the power for the service packets transmitted simultaneously, or allocating the power for the service packets transmitted simultaneously according to the same power spectrum density of the physical sidelink shared channel, or randomly selecting a service packet on one of the links for transmitting.

Optionally, in an embodiment of the application, a priority of a service packet transmitted by the first link is determined according to a level of ProSe Per-Packet Priority, PPPP; a priority of a service packet transmitted by the second link is determined according to a level of at least one indicator of priority, packet delay budget, reliability, communication range and packet transmission rate in Quality of Service, QoS; and there is a preset correspondence between the level of the at least one indicator in the QoS of the service packet transmitted on the second link and a priority level of the service packet transmitted on the first link;

or, priorities of service packets transmitted by the first link are higher than priorities of service packets transmitted by the second link;

or, priorities of service packets transmitted by the first link are lower than priorities of service packets transmitted by the second link;

or, priorities of some service packets transmitted by the second link are higher than a priority of any service packet transmitted by the first link, and priorities of remaining service packets transmitted by the second link are lower than the priority of any service packet transmitted by the first link.

Optionally, in an embodiment of the application, the processor 702 is specifically configured for:

excluding, on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold;

if so, determining that the resources on the transmission link for the service packet to be transmitted that overlap in the time domain with resources that have been selected on the other link are allowed to be selected;

if not, determining that the resources on the transmission link for the service packet to be transmitted that overlap in the time domain with resources that have been selected on the other link are not allowed to be selected.

Optionally, in an embodiment of the application, the processor 702 is specifically configured for:

in a case that the terminal comprises one power amplifier, determining that the resources on the transmission link for the service packet to be transmitted that overlap in time domain with resources that have been selected on other link are not allowed to be selected;

or, in a case that the terminal comprises a plurality of power amplifiers, determining that the resources on the transmission link for the service packet to be transmitted that overlap in time domain with resources that have been selected on other link are allowed to be selected.

Optionally, in an embodiment of the application, the processor 702 is specifically configured for:

excluding on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold, and judging whether the terminal comprises a plurality of power amplifiers;

if two judgment conditions are both met, determining that the resources on the transmission link for the service packet to be transmitted that overlap in time domain with resources that have been selected on other link are allowed to be selected;

otherwise, determining that the resources on the transmission link for the service packet to be transmitted that overlap in time domain with resources that have been selected on other link are not allowed to be selected.

Optionally, in an embodiment of the application, the preset threshold is the minimum number of resources that meet the packet delay budget and a requirement for the number of initial transmission and retransmissions;

and/or, the preset threshold is determined according to a preset correspondence between a level of at least one indicator in the QoS of service packets transmitted on the second link and a priority of each service packet on the first link.

Optionally, in an embodiment of the application, the processor 702 is further configured for: before selecting resources for the service packet to be transmitted, excluding resources determined to be occupied on the transmission link to obtain a second candidate resource set; wherein the second candidate resource set comprises the resources that overlap in the time domain with resources that have been selected on the other link;

the processor 702 is specifically configured for: selecting resources for the service packet to be transmitted in the second candidate resource set; or, screening the second candidate resource set according to a first preset screening rule, and then selecting resources for the service packet to be transmitted in the screened second candidate resource set.

Optionally, in an embodiment of the application, the processor 702 is further configured for: after obtaining the second candidate resource set, for the second candidate resource set, in a case that the terminal comprises one power amplifier, traversing resources that overlap in the time domain with resources that have been selected on the other link in the second candidate resource set;

in response to determining that there are resources that overlap in the time domain with and have a different time slot length from the resources that have been selected on the other link, excluding the resources that overlap in the time domain with and have the different length in time domain from the second candidate resource set, to obtain an updated second candidate resource set.

Optionally, in an embodiment of the application, the processor 702 is further configured for: before selecting the resources that do not overlap in the time domain with resources that have been selected on the other link for the service packet to be transmitted, excluding on the transmission link for the service packet to be transmitted, resources determined to be occupied and the resources that overlap in the time domain with resources that have been selected on the other link, to obtain a first candidate resource set;

the processor 702 is specifically configured for: selecting resources for transmitting the service packet in the first candidate resource set; or, screening the first candidate resource set according to a second preset screening rule, and then selecting resources for transmitting the service packet in the screened first candidate resource set.

Optionally, in an embodiment of the application, the processor 702 is further configured for: when determining that the resource multiplexing mode of the first link and the second link is time division multiplexing or a combination of time division multiplexing and frequency division multiplexing, selecting resources for the service packet to be transmitted among the time-frequency resources available on the transmission link under a sensing-based semi-persistent scheduling resource selection mode;

or, after monitoring a channel where the time-frequency resources available on the transmission link are located, excluding resources determined to be occupied on the transmission link to obtain a third candidate resource set, and judging whether each resource in the third candidate resource set meets a packet delay budget; in response to determining that each resource in the third candidate resource set meets a packet delay budget, performing resource selection and/or performing first back-off processing and then resource selection; otherwise, performing back-off processing and monitoring the channel again where the time-frequency resources available on the transmission link are located.

Optionally, in an embodiment of the application, the processor 702 is specifically configured for: monitoring the channel where the time-frequency resources available on the transmission link are located by:

decoding a control signaling transmitted in a time division multiplexing mode to obtain the indication information;

or, detecting a preamble sequence to obtain the indication information;

or, detecting the channel energy.

Here, in FIG. 7, the bus architecture may include any numbers of interconnected buses and bridges, and specifically link various circuits of one or more processors represented by the processor 702 and the memory represented by the memory 701. The bus architecture may further link various other circuits such as peripheral device, voltage regulator and power management circuit, which are all well known in the art and thus will not be further described again herein. The bus interface provides an interface. The bus interface provides an interface. The transceiver may be a plurality of elements, i.e., include a transmitter and a receiver, and provide the units for communicating with various other devices over the transmission media. For different user equipments, the user interface can also be the interface capable of inter-connecting or exter-connecting with the required devices, and the connected devices include but not limited to keypad, display, loudspeaker, microphone, joystick and the like.

The processor 702 is responsible for managing the bus architecture and general processing, and the memory 701 may store the data used by the processor 702 when performing the operations.

The processor 702 in the embodiment of the application may be Central Processing Unit (CPU), Application Specific Integrated Circuit (ASIC), Field-Programmable Gate Array (FPGA) or Complex Programmable Logic Device (CPLD).

Figure 8:
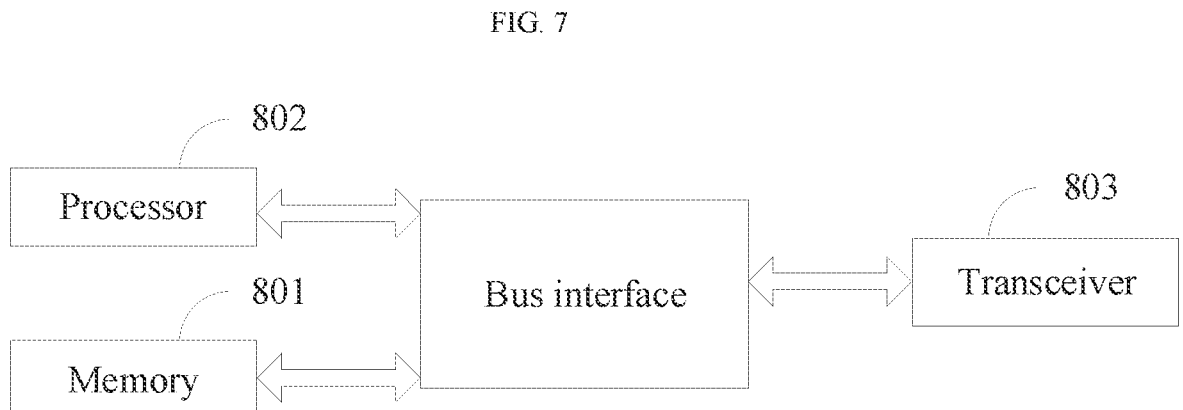
FIG. 8 is a structural schematic diagram of a first data transmission device provided in an embodiment of the application.

Based on the same inventive concept, an embodiment of the application further provides a data transmission device, which is applied to a terminal configured with a first link and a second link, and as shown in FIG. 8, which may include:

a memory 801 configured to store program instructions;

a processor 802 configured to invoke the program instructions stored in the memory 801, and in accordance with the obtained program, perform the process of:

determining time-frequency resources for transmitting a service packet; wherein the time-frequency resources are determined by using the resource selection method according to the application above;

transmitting the service packet, a preset control signaling and/or a preset preamble sequence on the determined time-frequency resources via a transceiver 803.

Optionally, in an embodiment of the application, the transceiver 803 may be configured to receive and send data under the control of the processor 802.

Here, in FIG. 8, the bus architecture may include any numbers of interconnected buses and bridges, and specifically link various circuits of one or more processors represented by the processor 802 and the memory represented by the memory 801. The bus architecture may further link various other circuits such as peripheral device, voltage regulator and power management circuit, which are all well known in the art and thus will not be further described again herein. The bus interface provides an interface. The bus interface provides an interface. The transceiver 803 can be a plurality of elements, i.e., include a transmitter and a receiver, and provide the units for communicating with various other devices over the transmission media. For different user equipments, the user interface can also be the interface capable of inter-connecting or exter-connecting with the required devices, and the connected devices include but not limited to keypad, display, loudspeaker, microphone, joystick and the like.

The processor 802 is responsible for managing the bus architecture and general processing, and the memory 801 may store the data used by the processor 802 when performing the operations.

The processor 802 in the embodiment of the application may be Central Processing Unit (CPU), Application Specific Integrated Circuit (ASIC). Field-Programmable Gate Array (FPGA) or Complex Programmable Logic Device (CPLD).

It should be pointed out that any memory mentioned in the embodiments of the application may include Read-Only Memory (ROM) and Random Access Memory (RAM), and provide the processor with the program instructions and data stored in the memory. In an embodiment of the application, the memory may be used to store the program of any method provided by the embodiments of the application. The processor invokes the program instructions stored in the memory and is configured to perform any method provided by the embodiments of the application in accordance with the obtained program instructions.

Figure 9:
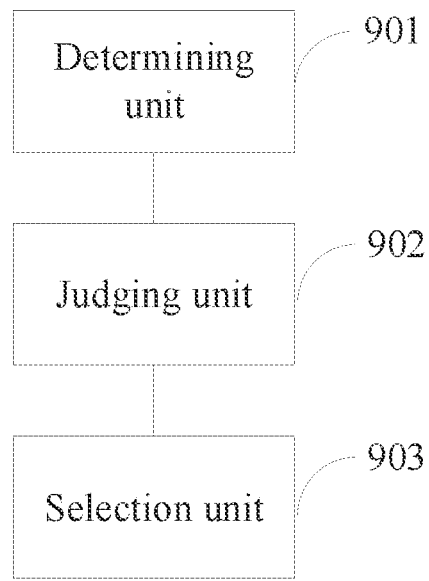
FIG. 9 is a structural schematic diagram of a second resource selection device provided in an embodiment of the application.

Based on the same inventive concept, an embodiment of the application further provides a resource selection device, which is applied to a terminal configured with a first link and a second link, and as shown in FIG. 9, which may include:

a determining unit 901 configured to determine a transmission link for a service packet to be transmitted; wherein the first link and the second link are used to transmit different types of service packets:

a judging unit 902 configured to judge whether resources on the transmission link for the service packet to be transmitted that overlap in time domain with resources that have been selected on other link are allowed to be selected, when determining that a resource multiplexing mode of the first link and the second link is frequency division multiplexing;

a selection unit 903 configured to: in response to that the resources on the transmission link for the service packet to be transmitted that overlap in time domain with resources that have been selected on other link are allowed to be selected, select transmission resources for the service packet to be transmitted among time-frequency resources available on the transmission link for the service packet to be transmitted, wherein selectable resources comprise: resources that overlap in the time domain with resources that have been selected on the other link, and/or resources that do not overlap in the time domain with resources that have been selected on the other link; in response to that the resources on the transmission link for the service packet to be transmitted that overlap in time domain with resources that have been selected on other link are not allowed to be selected, select transmission resources that do not overlap in the time domain with resources that have been selected on the other link for the service packet to be transmitted among the time-frequency resources available on the transmission link for the service packet to be transmitted.

Optionally, after selection resources for the service packet to be transmitted, the selection unit 903 is further configured to:

perform power allocation or transmitting order adjustment on service packets to be transmitted on resources that overlap in the time domain on the first link and the second link respectively, according to priorities of the service packets to be transmitted on the resources that overlap in the time domain on the first link and the second link.

Optionally, the selection unit 903 is specifically configured for:

if the priorities of the service packets to be transmitted on the resources that overlap in the time domain on the first link and the second link are different, allocating power that meets a packet delay budget to a service packet with high priority, and performing power reduction, dropping transmission or resource re-selection for a service packet with low priority;

or, if determining that the priorities of the service packets to be transmitted on the resources that overlap in the time domain on the first link and the second link are same, performing the power allocation or transmitting order adjustment on the service packets to be transmitted on resources that overlap in the time domain on the first link and the second link according to a quantity of power amplifiers of the terminal.

Optionally, the selection unit 903 is specifically configured for:

if the priorities of the service packets to be transmitted on the resources that overlap in the time domain on the first link and the second link are different, allocating power that meets a packet delay budget to a service packet with high priority and performing power reduction, dropping transmission or resource re-selection for a service packet with low priority;

or, if determining that the priorities of the service packets to be transmitted on the resources that overlap in the time domain on the first link and the second link are same, performing the power allocation or transmitting order adjustment on the service packets to be transmitted on resources that overlap in the time domain on the first link and the second link according to a quantity of power amplifiers of the terminal.

Optionally, the selection unit 903 is specifically configured to:

in a case that the terminal comprises a plurality of power amplifiers, transmitting service packets simultaneously through the resources that overlap in the time domain on the first link and the second link, and equally dividing transmission power for the service packets transmitted simultaneously, or allocating the transmission power for the service packets transmitted simultaneously according to a same power spectrum density of a physical sidelink shared channel;

or, in a case that the terminal comprises one power amplifier, judging whether time slot lengths of the resources that overlap in the time domain on the first link and the second link are same;

if not, selecting resources with a shorter length in time domain among the resources that overlap in the time domain on the first link and the second link to transmit service packets preferentially;

if so, transmitting service packets simultaneously through the resources that overlap in the time domain on the first link and the second link, and equally dividing the power for the service packets transmitted simultaneously, or allocating the power for the service packets transmitted simultaneously according to the same power spectrum density of the physical sidelink shared channel, or randomly selecting a service packet on one of the links for transmitting.

Optionally, a priority of a service packet transmitted by the first link is determined according to a level of ProSe Per-Packet Priority, PPPP; a priority of a service packet transmitted by the second link is determined according to a level of at least one indicator of priority, packet delay budget, reliability, communication range and packet transmission rate in Quality of Service, QoS; and there is a preset correspondence between the level of the at least one indicator in the QoS of the service packet transmitted on the second link and a priority level of the service packet transmitted on the first link;

or, priorities of service packets transmitted by the first link are higher than priorities of service packets transmitted by the second link;

or, priorities of service packets transmitted by the first link are lower than priorities of service packets transmitted by the second link;

or, priorities of some service packets transmitted by the second link are higher than the priority of any service packet transmitted by the first link, and priorities of remaining service packets transmitted by the second link are lower than the priority of any service packet transmitted by the first link.

Optionally, the judging unit 902 is specifically configured for:

excluding, on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold;

if so, determining that the resources on the transmission link for the service packet to be transmitted that overlap in the time domain with resources that have been selected on the other link are allowed to be selected;

if not, determining that the resources on the transmission link fir the service packet to be transmitted that overlap in the time domain with resources that have been selected on the other link are not allowed to be selected.

Optionally, the judging unit 902 is specifically configured to:

in a case that the terminal comprises one power amplifier, determining that the resources on the transmission link for the service packet to be transmitted that overlap in time domain with resources that have been selected on other link are not allowed to be selected;

or, in a case that the terminal comprises a plurality of power amplifiers, determining that the resources on the transmission link for the service packet to be transmitted that overlap in time domain with resources that have been selected on other link are allowed to be selected.

Optionally, the judging unit 902 is specifically configured for:

excluding on the transmission link for the service packet to be transmitted, resources determined to be occupied and the resources that overlap in the time domain with resources that have been selected on the other link, to obtain a first candidate resource set;

judging whether a quantity of resources meeting a packet delay budget in the first candidate resource set is less than a preset threshold, and judging whether the terminal comprises a plurality of power amplifiers;

in response to that two judgment conditions are both met, determining that the resources on the transmission link for the service packet to be transmitted that overlap in time domain with resources that have been selected on other link are allowed to be selected;

otherwise, determining that the resources on the transmission link for the service packet to be transmitted that overlap in time domain with resources that have been selected on other link are not allowed to be selected.

Optionally, the preset threshold is the minimum number of resources that meet the packet delay budget and a requirement for the number of initial transmission and retransmissions;

and/or, the preset threshold is determined according to a preset correspondence between a level of at least one indicator in the QoS of service packets transmitted on the second link and a priority of each service packet on the first link.

Optionally, before selecting resources for the service packet to be transmitted, the judging unit 902 is further configured for:

excluding resources determined to be occupied on the transmission link to obtain a second candidate resource set; wherein the second candidate resource set comprises the resources that overlap in the time domain with resources that have been selected on the other link, and the second candidate resource set corresponds to the selectable resources;

the selection unit 903 is specifically configured for:

selecting resources for the service packet to be transmitted from the second candidate resource set;

or, screening the second candidate resource set according to a first preset screening rule, and then selecting resources for the service packet to be transmitted in the screened second candidate resource set.

Optionally, after obtaining the second candidate resource set, the selection unit 903 is further configured for:

for the second candidate resource set, in a case that the terminal comprises one power amplifier, traversing resources that overlap in the time domain with resources that have been selected on the other link in the second candidate resource set;

when the judging unit 902 judges that there are resources that overlap in the time domain with and have a different time slot length from the resources that have been selected on the other link, excluding the resources that overlap in the time domain with and have the different length in time domain from the second candidate resource set, to obtain an updated second candidate resource set.

Optionally, before the selection unit 903 selects the resources that do not overlap in the time domain with resources that have been selected on the other link for the service packet to be transmitted, the judging unit 902 is further configured for:

excluding on the transmission link for the service packet to be transmitted, resources determined to be occupied and the resources that overlap in the time domain with resources that have been selected on the other link, to obtain a first candidate resource set;

the selection unit 903 is specifically configured for:

selecting resources for the service packet to be transmitted in the first candidate resource set;

or, screening the first candidate resource set according to a second preset screening rule, and selecting resources for the service packet to be transmitted in the screened first candidate resource set.

Optionally, when determining that the resource multiplexing mode of the first link and the second link is time division multiplexing or a combination of time division multiplexing and frequency division multiplexing, the selection unit 903 is further configured for:

selecting resources for the service packet to be transmitted among the time-frequency resources available on the transmission link under a sensing-based semi-persistent scheduling resource selection mode;

or, after the judging unit 902 monitors a channel where the time-frequency resources available on the transmission link are located, excluding resources determined to be occupied on the transmission link to obtain a third candidate resource set, and judging whether each resource in the third candidate resource set meets a packet delay budget; in response to determining that each resource in the third candidate resource set meets a packet delay budget, performing resource selection and/or performing first back-off processing and then resource selection; otherwise, performing back-off processing and monitoring the channel again where the time-frequency resources available on the transmission link are located.

Optionally, a mode of monitoring the channel where the time-frequency resources available on the transmission link are located specifically includes:

decoding a control signaling transmitted in a time division multiplexing mode to obtain the indication information;

or, detecting a preamble sequence to obtain the indication information;

or, detecting the channel energy.

In a specific implementation, the determining unit 901, the judging unit 902 and the selection unit 903 in the embodiment of the application may all be implemented by the processor 702 in FIG. 7. Of course, they are not limited thereto, and can also be implemented by other hardware structures.

Figure 10:
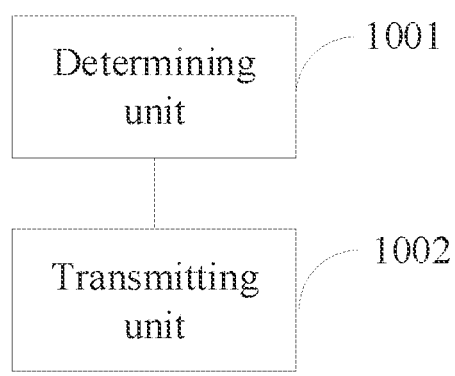
FIG. 10 is a structural schematic diagram of a second data transmission device provided in an embodiment of the application.

Based on the same inventive concept, an embodiment of the application further provides a data transmission device, which is applied to a terminal configured with a first link and a second link, and as shown in FIG. 10, which includes:

a determining unit 1001 configured to determine time-frequency resources for transmitting a service packet; wherein the time-frequency resources are determined by using the above resource selection method as provided in the embodiments of the application;

a transmitting unit 1002 configured to transmit the service packet, a preset control signaling and/or a preset preamble sequence on the determined time-frequency resources.

During specific implementation, in the embodiment of the application, the determining unit 1001 may be implemented by the processor 802 shown in FIG. 8, and the transmitting unit 1002 may be implemented by the transceiver 803 in FIG. 8. Of course, they are not limited thereto, and the determining unit 1001 and the transmitting unit 1002 can also be implemented by other hardware structures.

Based on the same concept, an embodiment of the application further provides a computer readable storage medium storing computer executable instructions which are configured to cause a computer to perform any one of the above-mentioned methods provided by the embodiments of the application.

The readable storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

It is necessary to note that the terminal mentioned in the embodiments of the application may also referred to as user equipment. Mobile Station (MS), Mobile Terminal (MT) or the like. Optionally, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The base station may be an access network device or a network side device (e.g., an access point), which means the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station may be the Base Transceiver Station (BTS) in the GSM or CDMA, or may be the NodeB in the WCDMA, or may be the evolutional Node B (NodeB or eNB or e-NodeB) in the LTE, which is not limited in the embodiments of the invention.

The processing flows of the above methods may be implemented by a software program, which may be stored in a storage medium. When the stored software program is invoked, the above method steps are performed.

It should be understood by those skilled in the art that the embodiments of the application can provide methods, systems and computer program products. Thus the application can take the form of hardware embodiments alone, software embodiments alone, or embodiments combining the software and hardware aspects. Also the application can take the form of computer program products implemented on one or more computer usable storage mediums (including but not limited to magnetic disk memories, optical memories and the like) containing computer usable program codes therein.

The application is described by reference to the flow charts and/or the block diagrams of the methods, the devices (systems) and the computer program products according to the embodiments of the application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the application.

The embodiments of the application provide a resource selection method and device, a data transmission method and device, and a computer readable storage medium. In the case of determining that the resource multiplexing mode of the first link and the second link is frequency division multiplexing, it can be further determined whether to select the resources that do not overlap in the time domain with resources that have been selected on the other link to transmit the service packet to be transmitted by judging whether it is allowed on the transmission link to select the resources that overlap in the time domain with resources that have been selected on the other link, so that the adjustment may also be performed according to actual needs on the basis of pre-configuration, thereby greatly increasing the flexibility of resource selection and the spectrum usage efficiency.

Evidently those skilled in the art can make various modifications and variations to the application without departing from the spirit and scope of the application. Thus the application is also intended to encompass these modifications and variations therein as long as these modifications and variations to the application come into the scope of the claims of the application and their equivalents.

What is claimed is:

1. A resource selection method, comprising:
   determining, by a terminal configured with a first link and a second link, a transmission link for a service packet to be transmitted; wherein the first link and the second link are used to transmit different types of service packets;
   judging, by the terminal, whether resources on the transmission link for the service packet to be transmitted that overlap in time domain with resources that have been selected on other link are allowed to be selected, when determining that a resource multiplexing mode of the first link and the second link is frequency division multiplexing;
   in response to that the resources on the transmission link for the service packet to be transmitted that overlap in time domain with resources that have been selected on other link are allowed to be selected, selecting, by the terminal, transmission resources for the service packet to be transmitted among time-frequency resources available on the transmission link for the service packet to be transmitted, wherein selectable resources comprise: resources that overlap in the time domain with resources that have been selected on the other link, and/or resources that do not overlap in the time domain with resources that have been selected on the other link;
   in response to that the resources on the transmission link for the service packet to be transmitted that overlap in time domain with resources that have been selected on other link are not allowed to be selected, selecting, by the terminal, transmission resources that do not overlap in the time domain with resources that have been selected on the other link for the service packet to be transmitted among the time-frequency resources available on the transmission link for the service packet to be transmitted.

2. The method of claim 1, wherein after selecting resources for the service packet to be transmitted, the method further comprises:
   performing, by the terminal, power allocation or transmitting order adjustment on service packets to be transmitted on resources that overlap in the time domain on the first link and the second link respectively, according to priorities of the service packets to be transmitted on the resources that overlap in the time domain on the first link and the second link.

3. The method of claim 2, wherein performing, by the terminal, power allocation or transmitting order adjustment on service packets to be transmitted on resources that overlap in the time domain on the first link and the second link respectively according to priorities of the service packets to be transmitted on the resources that overlap in the time domain on the first link and the second link, specifically comprises:
   if the priorities of the service packets to be transmitted on the resources that overlap in the time domain on the first link and the second link are different, allocating power that meets a packet delay budget to a service packet with high priority, and performing power reduction, dropping transmission or resource re-selection for a service packet with low priority;
   or, if determining that the priorities of the service packets to be transmitted on the resources that overlap in the time domain on the first link and the second link are same, performing the power allocation or transmitting order adjustment on the service packets to be transmitted on resources that overlap in the time domain on the first link and the second link according to a quantity of power amplifiers of the terminal.

4. The method of claim 3, wherein performing the power allocation or transmitting order adjustment on the service packets to be transmitted on resources that overlap in the time domain on the first link and the second link according to the quantity of power amplifiers of the terminal, comprises:
   in a case that the terminal comprises a plurality of power amplifiers, transmitting service packets simultaneously through the resources that overlap in the time domain on the first link and the second link, and equally dividing transmission power for the service packets transmitted simultaneously, or allocating the transmission power for the service packets transmitted simultaneously according to a same power spectrum density of a physical sidelink shared channel;
   or, in a case that the terminal comprises one power amplifier, judging whether time slot lengths of the resources that overlap in the time domain on the first link and the second link are same;
   in response to determining that time slot lengths of the resources that overlap in the time domain on the first link and the second link are not same, selecting resources with a shorter time slot length among the resources that overlap in the time domain on the first link and the second link to transmit service packets preferentially;
   in response to determining that time slot lengths of the resources that overlap in the time domain on the first link and the second link are same, transmitting service packets simultaneously through the resources that overlap in the time domain on the first link and the second link, and equally dividing the power for the service packets transmitted simultaneously, or allocating the power for the service packets transmitted simultaneously according to the same power spectrum density of the physical sidelink shared channel, or randomly selecting a service packet on one of the links for transmitting.

5. The method of claim 3, wherein a priority of a service packet transmitted by the first link is determined according to a level of ProSe Per-Packet Priority, PPPP; a priority of a service packet transmitted by the second link is determined according to a level of at least one indicator of priority, packet delay budget, reliability, communication range and packet transmission rate in Quality of Service, QoS; and there is a preset correspondence between the level of the at least one indicator in the QoS of the service packet transmitted on the second link and a priority level of the service packet transmitted on the first link;
 or, priorities of service packets transmitted by the first link are higher than priorities of service packets transmitted by the second link;
 or, priorities of service packets transmitted by the first link are lower than priorities of service packets transmitted by the second link;
 or, priorities of some service packets transmitted by the second link are higher than a priority of any service packet transmitted by the first link, and priorities of remaining service packets transmitted by the second link are lower than the priority of any service packet transmitted by the first link.

6. The method of claim 1, wherein judging whether resources on the transmission link for the service packet to be transmitted that overlap in time domain with resources that have been selected on other link are allowed to be selected, specifically comprises:
 excluding, on the transmission link for the service packet to be transmitted, resources determined to be occupied and the resources that overlap in the time domain with resources that have been selected on the other link, to obtain a first candidate resource set;
 judging whether a quantity of resources meeting a packet delay budget in the first candidate resource set is less than a preset threshold;
 in response to determining that the quantity of resources meeting a packet delay budget in the first candidate resource set is less than a preset threshold, the resources on the transmission link for the service packet to be transmitted that overlap in the time domain with resources that have been selected on the other link are allowed to be selected;
 in response to determining that the quantity of resources meeting a packet delay budget in the first candidate resource set is not less than a preset threshold, the resources on the transmission link for the service packet to be transmitted that overlap in the time domain with resources that have been selected on the other link are not allowed to be selected.

7. The method of claim 1, wherein judging whether resources on the transmission link for the service packet to be transmitted that overlap in time domain with resources that have been selected on other link are allowed to be selected, comprises:
 in a case that the terminal comprises one power amplifier, the resources on the transmission link for the service packet to be transmitted that overlap in time domain with resources that have been selected on other link are not allowed to be selected;
 or, in a case that the terminal comprises a plurality of power amplifiers, the resources on the transmission link for the service packet to be transmitted that overlap in time domain with resources that have been selected on other link are allowed to be selected.

8. The method of claim 1, wherein judging whether resources on the transmission link for the service packet to be transmitted that overlap in time domain with resources that have been selected on other link are allowed to be selected, specifically comprises:
 excluding on the transmission link for the service packet to be transmitted, resources determined to be occupied and the resources that overlap in the time domain with resources that have been selected on the other link, to obtain a first candidate resource set;
 judging whether a quantity of resources meeting a packet delay budget in the first candidate resource set is less than a preset threshold, and judging whether the terminal comprises a plurality of power amplifiers;
 in response to that two judgment conditions are both met, the resources on the transmission link for the service packet to be transmitted that overlap in time domain with resources that have been selected on other link are allowed to be selected;
 otherwise, the resources on the transmission link for the service packet to be transmitted that overlap in time domain with resources that have been selected on other link are not allowed to be selected.

9. The method of claim 6, wherein the preset threshold is a minimum quantity of resources that meet the packet delay budget and a requirement for a quantity of an initial transmission and retransmissions;
 and/or, the preset threshold is determined according to a preset correspondence between a level of at least one indicator in the QoS of service packets transmitted on the second link and a priority of each service packet on the first link.

10. The method of claim 1, wherein before selecting resources for the service packet to be transmitted, the method further comprises:
 excluding resources determined to be occupied on the transmission link to obtain a second candidate resource set; wherein the second candidate resource set comprises the resources that overlap in the time domain with resources that have been selected on the other link, and the second candidate resource set corresponds to the selectable resources;
 selecting resources for the service packet to be transmitted among time-frequency resources available on the transmission link for the service packet to be transmitted, specifically comprises:
 selecting resources for the service packet to be transmitted from the second candidate resource set;
 or, screening the second candidate resource set according to a first preset screening rule, and then selecting resources for the service packet to be transmitted in the screened second candidate resource set.

11. The method of claim 10, wherein after obtaining the second candidate resource set, the method further comprises:
 for the second candidate resource set, in a case that the terminal comprises one power amplifier, traversing resources that overlap in the time domain with resources that have been selected on the other link in the second candidate resource set;

in response to determining that there are resources that overlap in the time domain with and have a different time slot length from the resources that have been selected on the other link, excluding the resources that overlap in the time domain with and have the different time slot length from the second candidate resource set, to obtain an updated second candidate resource set.

12. The method of claim 1, wherein before selecting the resources that do not overlap in the time domain with resources that have been selected on the other link for the service packet to be transmitted, the method further comprises:

excluding on the transmission link for the service packet to be transmitted, resources determined to be occupied and the resources that overlap in the time domain with resources that have been selected on the other link, to obtain a first candidate resource set;

selecting resources that do not overlap in the time domain with resources that have been selected on the other link for the service packet to be transmitted among the time-frequency resources available on the transmission link for the service packet to be transmitted, comprises:

selecting resources for the service packet to be transmitted in the first candidate resource set;

or, screening the first candidate resource set according to a second preset screening rule, and selecting resources for the service packet to be transmitted in the screened first candidate resource set.

13. The method of claim 1, wherein when determining that the resource multiplexing mode of the first link and the second link is time division multiplexing or a combination of time division multiplexing and frequency division multiplexing, the method further comprises:

selecting resources for the service packet to be transmitted among the time-frequency resources available on the transmission link under a sensing-based semi-persistent scheduling resource selection mode;

or, after monitoring a channel where the time-frequency resources available on the transmission link are located, excluding resources determined to be occupied on the transmission link to obtain a third candidate resource set, and judging whether each resource in the third candidate resource set meets a packet delay budget; in response to determining that each resource in the third candidate resource set meets a packet delay budget, performing resource selection and/or performing first back-off processing and then resource selection; otherwise, performing back-off processing and monitoring the channel again where the time-frequency resources available on the transmission link are located.

14. The method of claim 13, wherein a mode of monitoring the channel where the time-frequency resources available on the transmission link are located comprises:

decoding a control signaling transmitted in a time division multiplexing mode to obtain indication information;

or, detecting a preamble sequence to obtain indication information;

or, detecting channel energy.

15. A data transmission method, comprising:
determining time-frequency resources for transmitting a service packet; wherein the time-frequency resources are determined by using the resource selection method of claim 1;
transmitting the service packet, a preset control signaling and/or a preset preamble sequence on the time-frequency resources.

16. A resource selection device, wherein the device is applied to a terminal configured with a first link and a second link, and comprises:
a memory configured to store program instructions;
a processor configured to invoke the program instructions stored in the memory, and in accordance with the obtained program, perform a process of:
determining a transmission link for a service packet to be transmitted; wherein the first link and the second link are used to transmit different types of service packets;
judging whether resources on the transmission link for the service packet to be transmitted that overlap in time domain with resources that have been selected on other link are allowed to be selected, when determining that a resource multiplexing mode of the first link and the second link is frequency division multiplexing;
in response to that the resources on the transmission link for the service packet to be transmitted that overlap in time domain with resources that have been selected on other link are allowed to be selected, selecting transmission resources for the service packet to be transmitted among time-frequency resources available on the transmission link for the service packet to be transmitted, wherein selectable resources comprise: resources that overlap in the time domain with resources that have been selected on the other link, and/or resources that do not overlap in the time domain with resources that have been selected on the other link;
in response to that the resources on the transmission link for the service packet to be transmitted that overlap in time domain with resources that have been selected on other link are not allowed to be selected, selecting transmission resources that do not overlap in the time domain with resources that have been selected on the other link for the service packet to be transmitted among the time-frequency resources available on the transmission link for the service packet to be transmitted.

17. A data transmission device, wherein the device comprises:
a memory configured to store program instructions;
a processor configured to invoke the program instructions stored in the memory, and in accordance with the obtained program, perform the process of:
determining time-frequency resources for transmitting a service packet; wherein the time-frequency resources are determined by using the resource selection method of claim 1;
transmitting the service packet, a preset control signaling and/or a preset preamble sequence on the time-frequency resources.

18. A non-transitory computer readable storage medium, storing computer executable instructions which are configured to cause the computer to perform the method of claim 1.

* * * * *